United States Patent
Yanada

(10) Patent No.: US 8,483,491 B2
(45) Date of Patent: Jul. 9, 2013

(54) CALCULATION DEVICE AND METHOD

(75) Inventor: Takashi Yanada, Tokyo (JP)

(73) Assignee: Olympus Corporation, Tokyo (JP)

( * ) Notice: Subject to any disclaimer, the term of this patent is extended or adjusted under 35 U.S.C. 154(b) by 3 days.

(21) Appl. No.: 13/236,720

(22) Filed: Sep. 20, 2011

(65) Prior Publication Data

US 2012/0082399 A1  Apr. 5, 2012

(30) Foreign Application Priority Data

Sep. 30, 2010  (JP) ................. 2010-220156

(51) Int. Cl.
*G06K 9/72* (2006.01)

(52) U.S. Cl.
USPC ........................................ 382/226

(58) Field of Classification Search
USPC ............... 382/100, 103, 106, 107, 190, 208, 382/224, 228
See application file for complete search history.

(56) References Cited

U.S. PATENT DOCUMENTS

| | | | | |
|---|---|---|---|---|
| 5,764,557 A | * | 6/1998 | Hara et al. | 708/603 |
| 7,580,968 B2 | * | 8/2009 | Tessarolo | 708/603 |
| 7,739,324 B1 | * | 6/2010 | Das et al. | 708/603 |
| 8,184,915 B2 | * | 5/2012 | Doretto et al. | 382/224 |
| 2011/0158544 A1 | * | 6/2011 | Hashiguchi | 382/201 |
| 2012/0249726 A1 | * | 10/2012 | Corcoran et al. | 348/36 |

FOREIGN PATENT DOCUMENTS

JP  2004-185611 A  7/2004

OTHER PUBLICATIONS

P. Viola and M. Jones, "Robust Real-Time Face Detection," Int'l J.Computer Vision, vol. 57, No. 2, pp. 137-154, May 2004.*

* cited by examiner

*Primary Examiner* — Andrae S Allison
(74) *Attorney, Agent, or Firm* — Westerman, Hattori, Daniels & Adrian, LLP

(57) ABSTRACT

A calculation device may include a data read unit configured to sequentially read pixel values in the first direction while sequentially making a shift in the second direction from a position of a reference pixel in the first and second directions, a first data integration unit configured to output a sum of values of pixels as a first integration value, a second data integration unit configured to output a sum of values of pixels as a second integration value, and a data cumulative calculation unit configured to obtain a cumulative value by accumulating pixel values respectively included in a first rectangular data area expressed by the first number of pixels in the first direction and the second number of pixels in the second direction based on the first integration value output from the first data integration unit and the second integration value output from the second data integration unit.

8 Claims, 12 Drawing Sheets

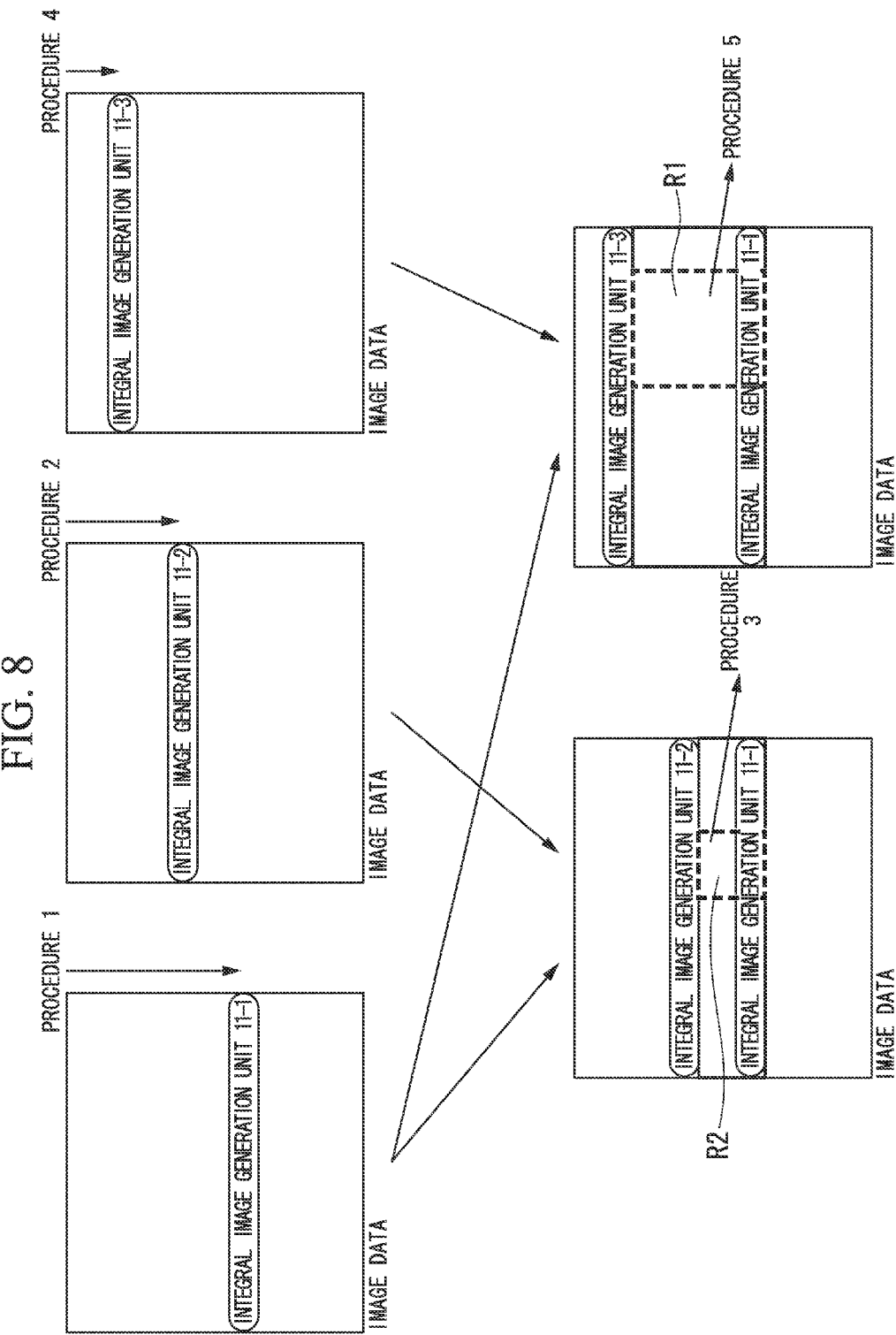

IMAGE DATA

IMAGE DATA

IMAGE DATA

IMAGE DATA

FIG. 11A

| 1 | 2 | 3 | 4 | 5 | 6 |
|---|---|---|---|---|---|
| 7 | 8 | 9 | 10 | 11 | 12 |
| 13 | 14 | 15 | 16 | 17 | 18 |
| 19 | 20 | 21 | 22 | 23 | 24 |
| 25 | 26 | 27 | 28 | 29 | 30 |
| 31 | 32 | 33 | 34 | 35 | 36 |

IMAGE DATA

FIG. 11B

| 1 | 3 | 6 | 10 | 15 | 21 |
|---|---|---|----|----|----|
| 8 | 18 | 30 | 44 | 60 | 78 |
| 21 | 45 | 72 | 102 | 135 | 171 |
| 40 | 84 | 132 | 184 | 240 | 300 |
| 65 | 135 | 210 | 290 | 375 | 465 |
| 96 | 198 | 306 | 420 | 540 | 666 |

INTEGRAL IMAGE

FIG. 12A

IMAGE DATA

FIG. 12B

INTEGRAL IMAGE

CALCULATION DEVICE AND METHOD

BACKGROUND OF THE INVENTION

1. Field of the Invention

The present invention relates to a calculation device and method.

Priority is claimed on Japanese Patent Application No. 2010-220156, filed Sep. 30, 2010, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

A predetermined rectangular area is set for image data in which pixels are arranged in a two-dimensional matrix. Image processing such as filtering of image data is performed by integrating values of pixels within the rectangular area while shifting the rectangular area pixel by pixel in horizontal and vertical directions. FIGS. 10A to 10D are diagrams schematically showing a state in which a rectangular area is shifted in image processing performed by integrating pixel values while shifting the rectangular area in accordance with the related art. FIG. 10A shows a state in which a rectangular area R of which pixel values are integrated is shifted pixel by pixel in the horizontal direction. FIG. 10B shows a state in which the rectangular area R is shifted by one row in the vertical direction after an integration of pixel values for one row of image data is completed, that is, after the rectangular area R is shifted to a position of the last pixel of a first row of the image data. FIG. 10C shows a state in which the rectangular area R is re-shifted pixel by pixel in the horizontal direction after the rectangular area R is shifted by one row in the vertical direction. In image processing to be performed while the rectangular area is shifted as described above, the predetermined rectangular area R is shifted pixel by pixel in the horizontal and vertical directions as shown in FIGS. 10A to 10C. When the position of the rectangular area R is shifted to a position of the last pixel of the last row of the image data as shown in FIG. 10D, the integration of values of pixels within the rectangular area R is completed.

In the image processing as described above, the following methods are used to integrate values of pixels within a predetermined rectangular area. For example, there is a method of preparing line memories corresponding in number to a height of the rectangular area and performing an integration process for pixel values stored in the line memories. In this method, the rectangular area is sequentially shifted in the vertical direction while data of the line memory unused in the integration process is rewritten to data of a row for which the next integration process is performed by the line memory. In the configuration as described above, the height of the rectangular area for which the integration process can be performed is limited to a height corresponding to the number of prepared line memories. Because it is necessary to prepare more line memories so as to reduce the limit of the height of the rectangular area, the circuit scale is increased.

Further, for example, there is a method of performing an integration process while reading values of pixels within a rectangular area to be integrated from a line memory storing image data every time. In this method, the limit on the height of the rectangular area can be eliminated. In this method, image data is read every time so as to acquire values of pixels within a rectangular area for which the integration process is performed. Thus, the number of memory accesses to the memory storing image data is large and hence the integration process is time-consuming.

As a technique of the integration process, for example, Japanese Unexamined Patent Application, First Publication No. 2004-185611 discloses a method of integrating image data using an integral image. The integral image has a feature that each pixel value is a cumulative value of a rectangular area from the origin. In Japanese Unexamined Patent Application, First Publication No. 2004-185611, the feature is maintained and the integral image is used in an integration process for the rectangular area.

Here, an integral image and an integration process within a predetermined rectangular area using the integral image will be described. FIGS. 11A and 11B are schematically diagrams showing examples of image data and an integral image based on the image data. FIGS. 12A and 12B are diagrams illustrating a processing method for an integration process using an integral image.

The integral image is data in which a position of a predetermined pixel of the image data is designated as the origin and a sum of values of all pixels within a rectangular area where the origin is diagonal to a position of a target pixel (or where pixels are located on both ends) is designated as a target pixel value. FIG. 11A shows image data of 6 rows and 6 columns, and FIG. 11B shows an integral image for the image data of the 6 rows and the 6 columns shown in FIG. 11A. The integral image shown in FIG. 11B is an integral image in which a sum of values of pixels, within a rectangular area having a pixel of a first column of a first row of the image data shown in FIG. 11A as the origin, is regarded as each pixel value. For example, a value "18", which is obtained by a sum of a pixel value "1" of a first column of a first row, a pixel value "2" of a second column of the first row, a pixel value "7" of a first column of a second row, and a pixel value "8" of a second column of the second row, is regarded as the pixel value of the second column of the second row.

Using the integral image, it is possible to easily obtain integration values of all pixels within a predetermined rectangular area from values of pixels within a rectangular area including the predetermined rectangular area from which the integration values are obtained and pixel values within rectangular areas in contact with the predetermined rectangular area. More specifically, for example, an integration value of all pixels within a rectangular area R in image data shown in FIG. 12A may be obtained. In this case, as shown in FIG. 12B, an integration value of all pixels within the rectangular area R is obtained by the following Equation (1) from a value of a pixel on the diagonal to the origin within a rectangular area A including the rectangular area R and values of pixels on the diagonal to the origin within a rectangular area B, a rectangular area C, and a rectangular area D in contact with the rectangular area R.

$$r = a - b - c + d \quad (1)$$

In the above Equation (1), r denotes an integration value of all pixels within the rectangular area R, a denotes a value of a pixel on the diagonal to the origin in the rectangular area A, b denotes a value of a pixel on the diagonal to the origin in the rectangular area B, c denotes a value of a pixel on the diagonal to the origin in the rectangular area C, and d denotes a value of a pixel on the diagonal to the origin in the rectangular area D.

A calculation is carried out based on pixel values within the image data and pixel values within the integral image shown in FIGS. 12A and 12B. An integration value of the rectangular area R in the image data of FIG. 12A becomes 15+16+17+

21+22+23+27+28+29=198. If the integration value of the rectangular area R is obtained by the above Equation (1) from the pixel values within the integral image of FIG. 12B, 375−135−60+18=198. As described above, it is possible to easily obtain integration values of all pixels of a specific rectangular area by use of an integral image.

A storage capacity of a memory becomes significantly large so as to expand and store an integral image corresponding to image data in the memory. For example, an integral image corresponding to one image data obtained by capturing a moving image may be stored in a memory in an image capturing device such as a still-image camera, a moving-image camera, a medical endoscope camera, or an industrial endoscope camera. In this case, in the image data of the moving image, one pixel is 8 bits (1 byte), 640 pixels are in a row direction, and 480 pixels are in a column direction. If an integral image corresponding to one image data is simply stored in the memory, a memory storage capacity per pixel necessary to store a total of pixels is 1 (byte)×640 (pixels)×480 (pixels)=307.2 (kilobytes). A memory storage capacity of one page of the image data of the moving image becomes 307.2 (kilobytes)×640 (pixels)×480 (pixels)=94.37 (gigabytes).

As described above, a memory of a large storage capacity is necessary to simply store an integral image corresponding to image data. It is inefficient to prepare such a memory having large storage capacity in advance. Thus, it is difficult to pre-expand an integral image in a memory in order to perform an integration process.

SUMMARY

A calculation device may include: a data read unit configured to sequentially read pixel values, which are included in an image data group formed by a plurality of pixel values two-dimensionally arranged in first and second directions, in the first direction while sequentially making a shift in the second direction from a position of a reference pixel in the first and second directions; a first data integration unit configured to output a sum of values of pixels, which are included in a rectangular area in which pixels in the position of the reference pixel and a first position of the second direction sequentially read by the data read unit are designated as vertices, as a first integration value; a second data integration unit configured to output a sum of values of pixels, which are included in a rectangular area in which pixels in the position of the reference pixel and a second position of the second direction sequentially read by the data read unit are designated as vertices, as a second integration value; and a data cumulative calculation unit configured to obtain a cumulative value by accumulating pixel values respectively included in a first rectangular data area expressed by the first number of pixels in the first direction and the second number of pixels in the second direction based on the first integration value output from the first data integration unit and the second integration value output from the second data integration unit. The cumulative values of the plurality of pixel values included in the first rectangular data area when the first rectangular data area may be sequentially shifted in the second direction while the first rectangular data area is sequentially shifted in the first direction are sequentially output.

Each of the first and second data integration units may include: a first integration unit configured to sequentially output integration values of pixel values from the position of the reference pixel in the first direction to a position of a pixel currently read in the first direction as integration values of the first direction; a second integration unit configured to sequentially output integration values of the second direction by adding integration values of the first direction previously obtained by integration calculations of the first integration unit to integration values of the first direction currently obtained by integration calculations of the first integration unit after a position of a pixel from which a pixel value is read by the data read unit is shifted in the second direction; and an integration value storage unit configured to store an integration value of the second direction corresponding to each pixel position as a previous integration value. The integration values of the second direction may be respectively output as the first integration value output by the first data integration unit and the second integration value output by the second data integration unit.

The data cumulative calculation unit may include: a first data delay unit configured to delay the first integration value obtained by an integration calculation of the first data integration unit by the first number of pixels in the first rectangular data area; a second data delay unit configured to delay the second integration value obtained by an integration calculation of the second data integration unit by the first number of pixels in the first rectangular data area; and a cumulative calculation unit configured to calculate a cumulative value by accumulating a plurality of pixel values included in the first rectangular area based on the first integration value, an integration value after the first integration value is delayed by the first data delay unit, the second integration value, and an integration value after the second integration value is delayed by the second data delay unit.

The first integration value may be an integration value of a lower side in the rectangular area. The second integration value may be an integration value of an upper side in the rectangular area.

The data read unit may start to read pixel values from the position of the reference pixel to input the read pixel values to the first data integration unit by controlling a read operation to be performed again in the first direction from a value of a pixel when the first position is shifted from the position of the reference pixel in the second direction after the pixel values are completely read by the first number of pixels in the first direction, input read pixel values to the second data integration unit by starting to read the pixel values from the position of the reference pixel after the first position is shifted by the second number of pixels in the first rectangular data area, and then control the reading of the image data group so that the reading of the pixel values to be input to the first data integration unit and the reading of the pixel values to be input to the second data integration unit are alternately performed.

The data read unit may start to read the pixel values to be input to the second data integration unit in the second position from the pixel value of the position of the reference pixel in the image data group after the first position is shifted by the second number of pixels in the first rectangular data area from a start of the reading of the pixel values to be input to the first data integration unit and the reading of all pixel values including a pixel value of the first position is completed, and then alternately perform the reading of pixel values of the first direction in the next first position to be input to the first data integration unit and the reading of pixel values of the first direction in the next second position to be input to the second data integration unit every time the reading of all pixel values of the first direction included in the image data group is completed.

The calculation device may further include: a third data integration unit configured to output a sum of values of pixels, which are included in a rectangular area in which the position of the reference pixel and each pixel of a third position of the second direction sequentially read by the data read unit are designated as vertices, as a third integration value; and a data cumulative calculation unit configure to obtain a cumulative value by accumulating pixel values respectively included in a second rectangular data area expressed by the third number of pixels in the first direction and the fourth number of pixels in the second direction based on the first integration value output from the first data integration unit and the third integration value output from the third data integration unit. The data read unit may input read pixel values to the third data integration unit by starting to read the pixel values from the position of the reference pixel after the third position is shifted by the fourth number of pixels in the second rectangular data area, and then control the reading of the image data group so that the reading of the pixel values to be input to the first data integration unit, the reading of the pixel values to be input to the second data integration unit, and the reading of the pixel values to be input to the third data integration unit are alternately performed. The data cumulative calculation unit may include: a third data delay unit configured to delay the first integration value obtained by an integration calculation of the first data integration unit by the third number of pixels in the second rectangular data area; a fourth data delay unit configured to delay the third integration value obtained by an integration calculation of the third data integration unit by the fourth number of pixels in the second rectangular data area; and a second cumulative calculation unit configured to calculate a second cumulative value by accumulating a plurality of pixel values included in the second rectangular area based on the first integration value, an integration value after the first integration value is delayed by the third data delay unit, and the third integration value, and an integration value after the third integration value is delayed by the fourth data delay unit. The calculation device may further sequentially output the second cumulative values of the plurality of pixel values included in the second rectangular data area when the second rectangular data area is sequentially shifted in the second direction while the second rectangular data area is sequentially shifted in the first direction along with the first rectangular area.

A calculation method may include: a data read step of sequentially reading pixel values, which are included in an image data group formed by a plurality of pixel values two-dimensionally arranged in first and second directions, in the first direction while sequentially making a shift in the second direction from a position of a reference pixel in the first and second directions; a first data integration step of outputting a sum of values of pixels, which are included in a rectangular area in which pixels in the position of the reference pixel and a first position of the second direction sequentially read by the data read step are designated as vertices, as a first integration value; a second data integration step of outputting a sum of values of pixels, which are included in a rectangular area in which pixels in the position of the reference pixel and a second position of the second direction sequentially read by the data read step are designated as vertices, as a second integration value; and a data cumulative calculation step of obtaining a cumulative value by accumulating pixel values respectively included in a first rectangular data area expressed by the first number of pixels in the first direction and the second number of pixels in the second direction based on the first integration value output by the first data integration step and the second integration value output by the second data integration step. The cumulative values of the plurality of pixel values included in the first rectangular data area when the first rectangular data area is sequentially shifted in the second direction while the first rectangular data area is sequentially shifted in the first direction may be sequentially output.

According to the calculation device and method of the present invention, it is possible to perform an integration process for a rectangular area of image data using an integral image without preparing a memory for expanding the integral image.

BRIEF DESCRIPTION OF THE DRAWINGS

The above features and advantages of the present invention will be more apparent from the following description of certain preferred embodiments taken in conjunction with the accompanying drawings, in which:

FIGS. 7A and 7B are diagrams schematically showing examples of rectangular areas of image data for which integration processes are performed in the calculation device in accordance with the second preferred embodiment of the present invention;

FIG. 8 is a diagram illustrating procedures of integration processes on rectangular areas in the calculation device in accordance with the second preferred embodiment of the present invention;

FIGS. 11A and 11B are schematically diagrams showing examples of image data and an integral image based on the image data; and FIGS. 12A and 12B are diagrams illustrating a processing method for an integration process using an integral image.

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated for explanatory purpose.

First Preferred Embodiment

Figure 1:
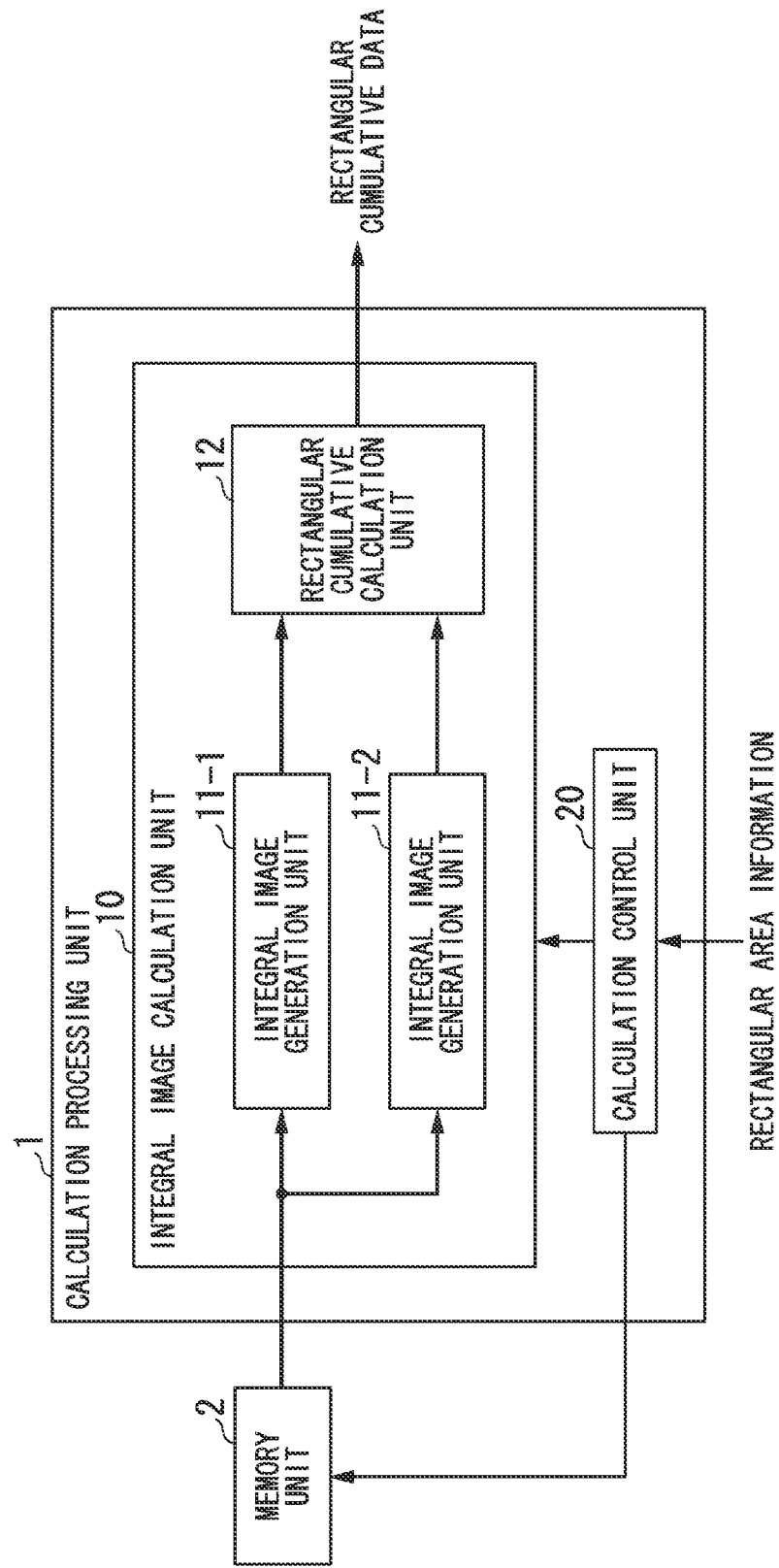
FIG. 1 is a block diagram showing a schematic configuration of a calculation device in accordance with a first preferred embodiment of the present invention.

Hereinafter, preferred embodiments of the present invention will be described with reference to the drawings. FIG. 1 is a block diagram showing a schematic configuration of a calculation device in accordance with a first preferred embodiment of the present invention. The calculation device shown in FIG. 1 includes a calculation processing unit 1 and a memory unit 2. The calculation processing unit 1 includes an integral image calculation unit 10 and a calculation control unit 20. The integral image calculation unit 10 includes two integral image generation units 11-1 and 11-2 and a rectangular cumulative calculation unit 12.

The calculation device shown in FIG. 1 is included, for example, in an image capturing device such as a still-image camera. In this case, the calculation processing unit 1, which is a component of the calculation device shown in FIG. 1, may be included, for example, in a signal processing device included in the image capturing device, and the memory unit 2 may be, for example, a memory device included in the image capturing device. Accordingly, the memory unit 2, which is a component of the calculation device shown in FIG. 1, may be a component unique to the calculation device.

In the following description, the calculation device shown in FIG. 1 is assumed to be included in the image capturing device. For image data stored in the memory unit 2 in the calculation device, integration values of all pixels within a rectangular area are obtained while a predetermined rectangular area set by a control unit of the image capturing device (not shown) is shifted pixel by pixel in horizontal and vertical directions as shown in FIGS. 10A to 10D.

The memory unit 2 is, for example, a storage device, which temporarily stores data, such as a dynamic random access memory (DRAM). The memory unit 2 stores image data in which pixels are arranged in a two-dimensional matrix acquired by the image capturing device as image data of an original image from which an integral image is generated. The memory unit 2 outputs pixel values of the stored image data to the calculation processing unit 1 in response to a memory read control signal input from the calculation processing unit 1.

The calculation processing unit 1 generates the integral image of the image data input from the memory unit 2. The calculation processing unit 1 performs an integration process, which obtains an integration value of all pixels within a predetermined rectangular area set by the control unit of the image capturing device (not shown) based on the generated integral image. The calculation processing unit 1 outputs data of an integration process result as rectangular cumulative data.

If the calculation control unit 20 outputs control signals for controlling the reading of image data stored in the memory unit 2 and the integration process by the integral image calculation unit 10 to the memory unit 2 and the integral image calculation unit 10 based on information of a rectangular area for which the integration process is performed set by the control unit of the image capturing device (not shown). In the calculation control unit 20, for example, information regarding a size or shape of the rectangular area within the image data is set in a pixel unit of the image data. Based on the information of the rectangular area set in the pixel unit, the calculation control unit 20 controls the timing when the image data is read from the memory unit 2 and is input to the integral image calculation unit 10 and the timings of integral image generation and cumulative calculation by the integral image calculation unit 10. Timing control in the calculation control unit 20 will be described later.

The integral image calculation unit 10 generates an integral image of the image data input from the memory unit 2 in response to an integration process control signal input from the calculation control unit 20. The integral image calculation unit 10 carries out a cumulative calculation on the rectangular area based on the generated integral image in response to the integration process control signal input from the calculation control unit 20. The integral image calculation unit 10 outputs data of a result of the cumulative calculation performed by the integral image calculation unit 10 to a processing unit of the image capturing device (not shown) as rectangular cumulative data, which is the result of the integration process performed by the calculation processing unit 1.

The integral image generation units 11-1 and 11-2 respectively generate integral images based on the input image data, and output data of the respectively generated integral images (hereinafter, referred to as "integral image data") to the rectangular cumulative calculation unit 12. Integral image generation timings of the integral image generation units 11-1 and 11-2 are controlled by control signals input from the calculation control unit 20.

The integral image generation units 11-1 and 11-2 have the same configuration. In the following description, the integral image generation unit 11-1 or 11-2 is referred to as an "integral image generation unit 11" when distinction is unnecessary. A configuration, an integral image data generation method, and an integral image data generation timing of the integral image generation unit 11 will be described later.

The rectangular cumulative calculation unit 12 carries out a cumulative calculation on image data within a rectangular area set by the control unit of the image capturing device (not shown) based on integral image data respectively input from the integral image generation units 11-1 and 11-2. A cumulative calculation timing of the rectangular cumulative calculation unit 12 is controlled by a control signal input from the calculation control unit 20. A configuration, a cumulative calculation method, and a cumulative calculation timing of the rectangular cumulative calculation unit 12 will be described later.

Figure 2:
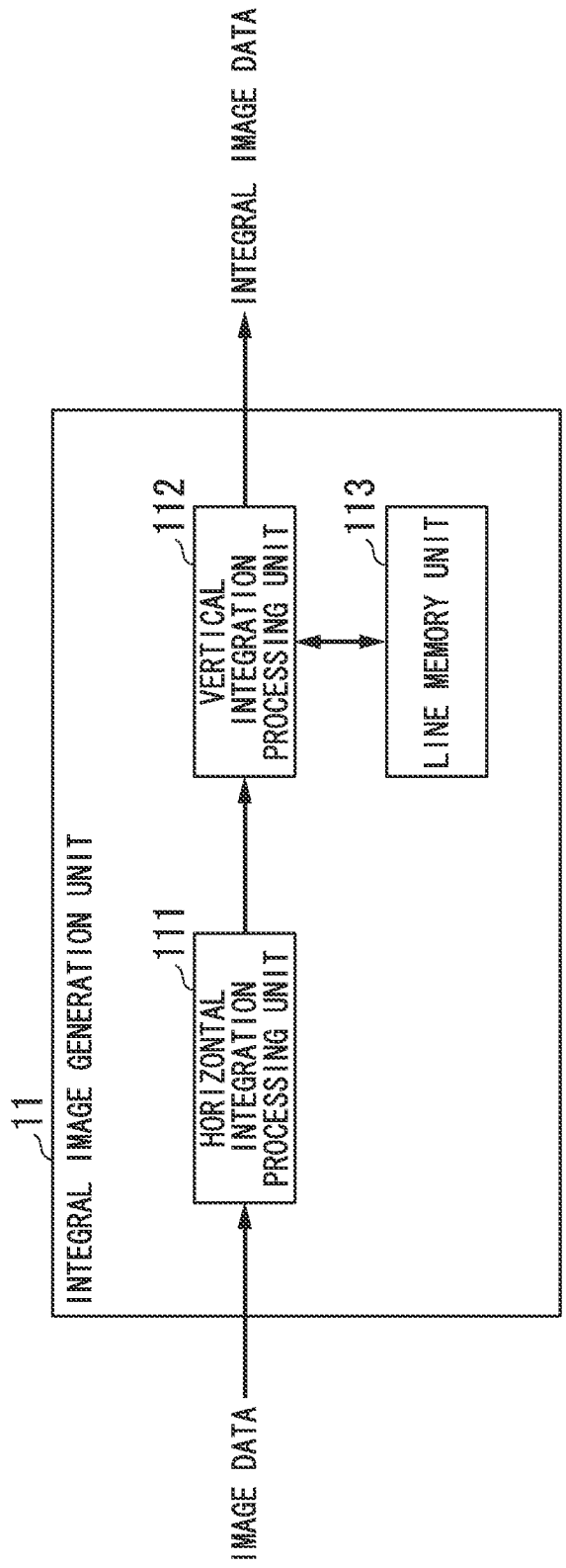
FIG. 2 is a block diagram showing a schematic configuration of an integral image generation unit included in the calculation device in accordance with the first preferred embodiment of the present invention.

Next, the integral image generation unit 11 included in the calculation processing unit 1 within the calculation device of the first preferred embodiment of the present invention will be described. FIG. 2 is a block diagram showing a schematic configuration of the integral image generation unit 11 included in the calculation device in accordance with the first preferred embodiment of the present invention. The integral image generation unit 11 shown in FIG. 2 includes a horizontal integration processing unit 111, a vertical integration processing unit 112, and a line memory unit 113.

If an operation of the integral image calculation unit 10 is started by the calculation control unit 20, the horizontal integration processing unit 111 sequentially adds pixel values of the image data input from the memory unit 2 for each row of the horizontal direction of the image data and outputs an addition result to the vertical integration processing unit 112. That is, the horizontal integration processing unit 111 sequentially adds pixel values for each pixel of the horizontal direction of the image data and outputs an addition result.

More specifically, for example, because there is no pixel value to be added when a value of a first pixel (a pixel of a first column) of a first row is input, the horizontal integration processing unit 111 outputs the input pixel value of the first column to the vertical integration processing unit 112. Subsequently, when a pixel value of a second column of the first row is input, the horizontal integration processing unit 111 outputs a value, which is obtained by adding the pixel value of the first column to the input pixel value of the second column, to the vertical integration processing unit 112. Subsequently, when a pixel value of a third column of the first row is input, the horizontal integration processing unit 111 adds added values of the pixel values of the first and second columns previously output to the vertical integration processing unit 112 to the input pixel value of the third column, and outputs an addition result to the vertical integration processing unit 112.

As described above, the horizontal integration processing unit 111 sequentially adds an input pixel value to a value previously output to the vertical integration processing unit 112 for each row of the horizontal direction of the image data, and outputs an addition result to the vertical integration processing unit 112. The horizontal integration processing unit 111 outputs an input pixel value of a first column of a second row to the vertical integration processing unit 112 because there is no pixel value of the second row to be added when a first pixel of the next row (the pixel of the first column of the second row) is input after a value obtained by adding all pixels of the first row of the horizontal direction in the image data is output to the vertical integration processing unit 112. Thereafter, likewise, an addition result is output to the vertical integration processing unit 112 by sequentially adding pixel values input from the memory unit 2 for each row of the image data.

The line memory unit 113 is a memory having a storage area capable of storing pixel values to be added by the vertical integration processing unit 112 for one row of the horizontal direction of the image data. Pixel values stored before an operation of the integral image calculation unit 10 is started by the calculation control unit 20 are initialized and thereafter the line memory unit 113 stores integral image data output by the vertical integration processing unit 112 for one row corresponding to the image data. In the following description, the initialized pixel values are assumed to be "0."

If the operation of the integral image calculation unit 10 is started by the calculation control unit 20, the vertical integration processing unit 112 adds pixel values sequentially added in the horizontal direction input from the horizontal integration processing unit 111 to pixel values corresponding to input pixels stored in the line memory unit 113. That is, the vertical integration processing unit 112 sequentially adds pixel values in the vertical direction of the image data. The vertical integration processing unit 112 outputs added pixel values to the rectangular cumulative calculation unit 12 as integral image data, and stores each of the output integral image data in a corresponding pixel storage area of the line memory unit 113 for each pixel. Thereby, integral image data for one row of the horizontal direction of the image data is stored in the line memory unit 113.

More specifically, for example, when pixel values of the first row from the horizontal integration processing unit 111 are sequentially input, the vertical integration processing unit 112 sequentially adds the input pixel values of the first row to a value "0" stored in the line memory unit 113, and sequentially outputs the added pixel values to the rectangular cumulative calculation unit 12 as integral image data. At this time, the pixel values of the first row input from the horizontal integration processing unit 111 are output as integral image data because the value stored in the line memory unit 113 is "0." The vertical integration processing unit 112 stores the output integral image data in a corresponding pixel storage area of the line memory unit 113 for each pixel.

Subsequently, when pixel values of a second row from the horizontal integration processing unit 111 are sequentially input, the vertical integration processing unit 112 sequentially adds the pixel values of the first row stored in the line memory unit 113 corresponding to input pixels to the input pixel values of the second row, and outputs the added pixel values to the rectangular cumulative calculation unit 12 as sequential integral image data. That is, values obtained by adding the pixel values of the first row input from the horizontal integration processing unit 111 to the pixel values of the second row input from the horizontal integration processing unit 111 for each pixel are output by the vertical integration processing unit 112 as integral image data. The vertical integration processing unit 112 stores the output integral image data in a corresponding pixel storage area of the line memory unit 113 for each pixel. That is, the pixel values of the first row input from the horizontal integration processing unit 111 stored in the line memory unit 113 are re-written to the pixel values of the output integral image data.

As described above, the vertical integration processing unit 112 sequentially adds input pixel values to corresponding pixel values of the integral image data previously output for each column of the vertical direction of image data, and outputs an addition result to the rectangular cumulative calculation unit 12. Thereafter, every time pixel values are sequentially input from the horizontal integration processing unit 111, an addition result is output to the rectangular cumulative calculation unit 12 by sequentially adding the input pixel values to corresponding pixel values of integral image data stored in the line memory unit 113.

Figure 3:
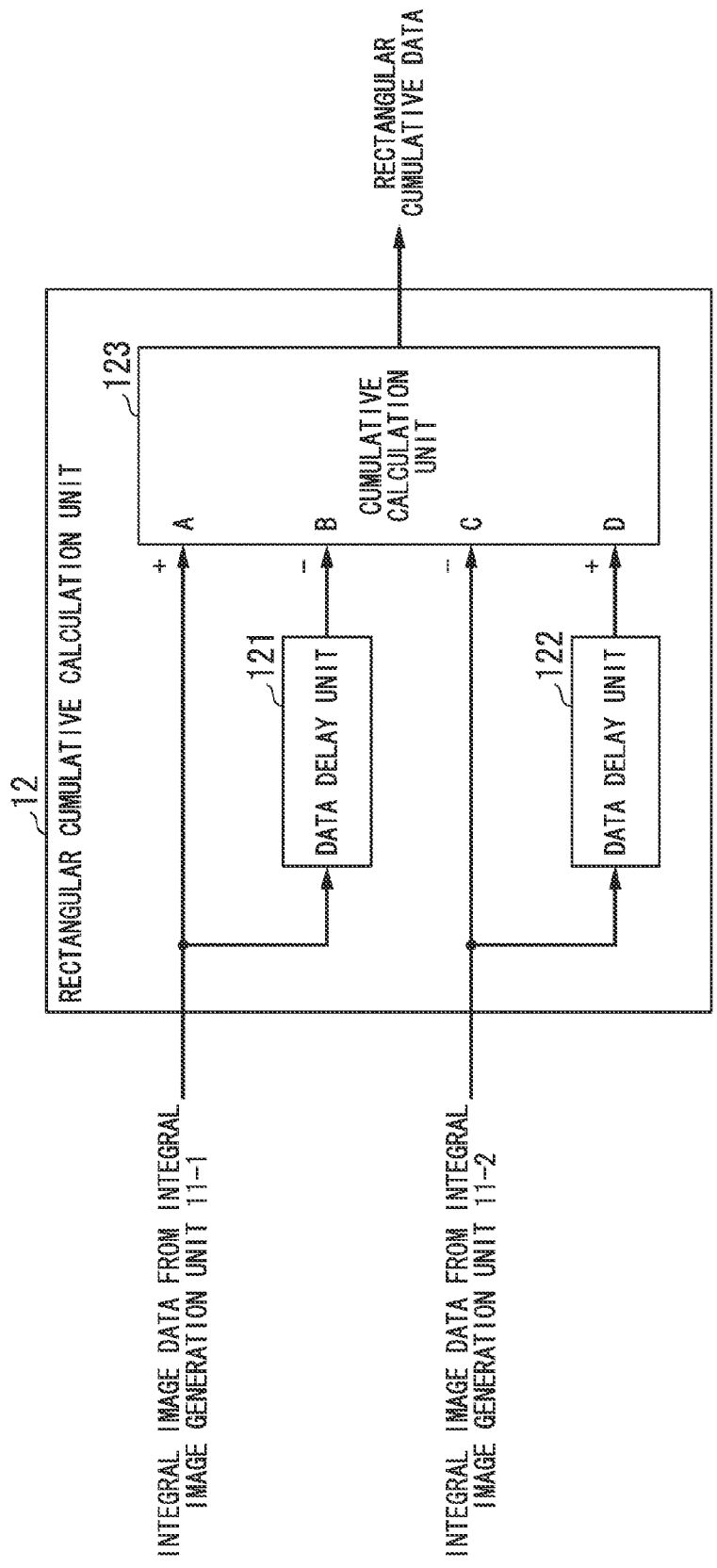
FIG. 3 is a block diagram showing a schematic configuration of a rectangular cumulative calculation unit included in the calculation device in accordance with the first preferred embodiment of the present invention.

Next, the rectangular cumulative calculation unit 12 included in the calculation processing unit 1 within the calculation device of the first preferred embodiment of the present invention will be described. FIG. 3 is a block diagram showing a schematic configuration of the rectangular cumulative calculation unit 12 included in the calculation device in accordance with the first preferred embodiment of the present invention. The rectangular cumulative calculation unit 12 shown in FIG. 3 includes a data delay unit 121, a data delay unit 122, and a cumulative calculation unit 123.

The data delay unit 121 delays integral image data input from the integral image generation unit 11-1 (hereinafter referred to as "integral image data D1") by the number of pixels of the horizontal direction in a rectangular area for which a cumulative calculation is carried out input from the calculation control unit 20, and outputs the delayed integral image data to the cumulative calculation unit 123. The data delay unit 122 delays integral image data input from the integral image generation unit 11-2 (hereinafter referred to as "integral image data D2") by the number of pixels of the horizontal direction in a rectangular area for which a cumulative calculation is carried out input from the calculation control unit 20, and outputs the delayed integral image data to the cumulative calculation unit 123. In the following description, the integral image data D1 delayed by the data delay unit 121 is referred to as "integral image data D1D." The integral image data D2 delayed by the data delay unit 122 is referred to as "integral image data D2D."

More specifically, for example, if the number of pixels of the horizontal direction in the rectangular area for which the cumulative calculation is carried out is 3, the data delay units 121 and 122 respectively output integral image data D1D and integral image data D2D, which are obtained by delaying integral image data D1 and integral image data D2 by 3 pixels, to the cumulative calculation unit 123.

Figures 12A, 12B:
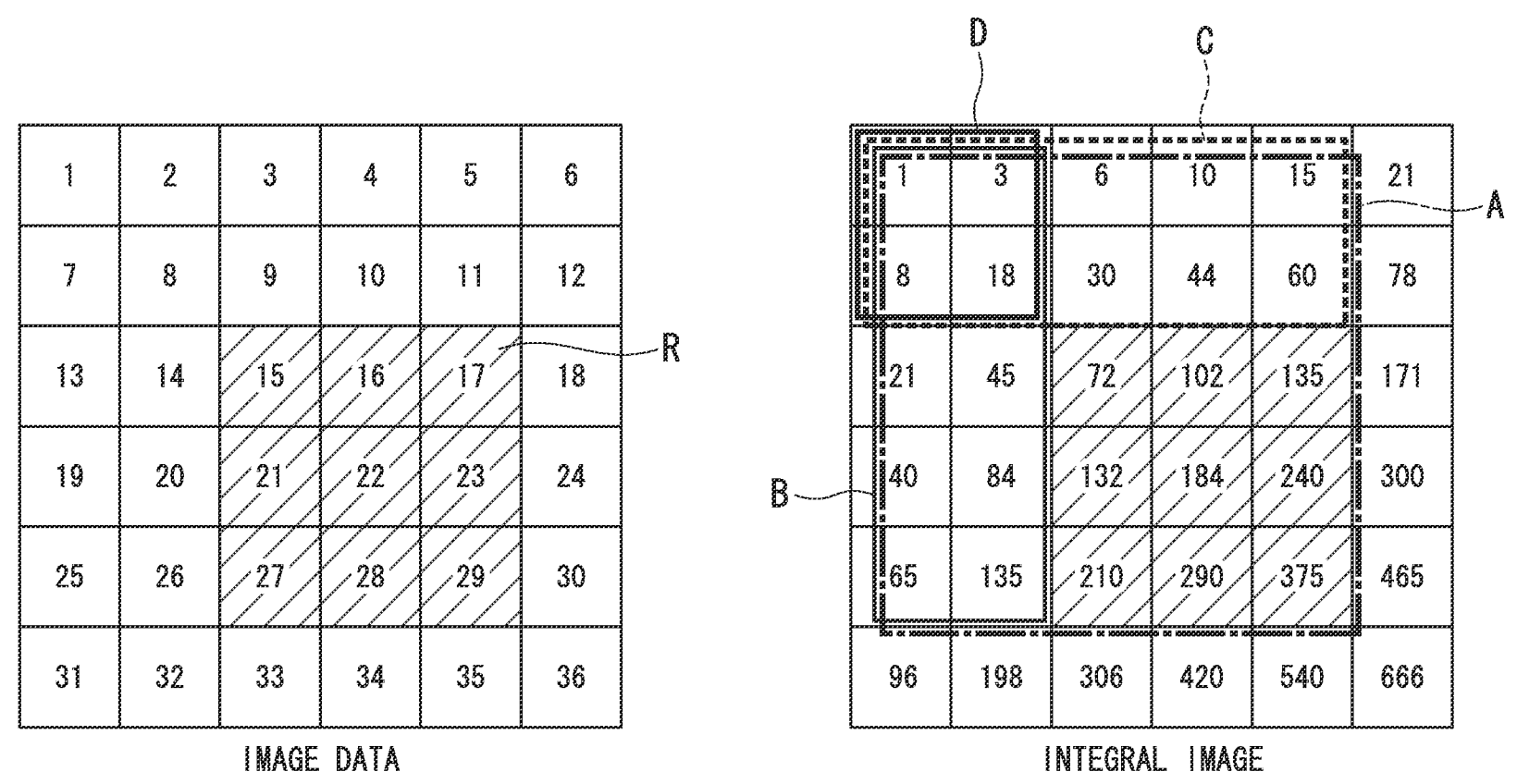

As described above, the data delay units 121 and 122 delay the integral image data D1 and the integral image data D2 by the number of pixels of the horizontal direction in the rectangular area, so that pixel values respectively corresponding to positions of pixels on the diagonal to the origin are aligned in the same column, for example, within rectangular areas A, B, C, and D shown in FIG. 12B.

The cumulative calculation unit 123 obtains integration values of all pixels within the rectangular area for which the cumulative calculation is carried out input from the calculation control unit 20 based on integral image data aligned in the same column by the data delay units 121 and 122.

More specifically, the cumulative calculation unit 123 handles the integral image data D1, the integral image data D1D, the integral image data D2, and the integral image data D2D as integral image data of the last row in the rectangular areas A, B, C, and D shown in FIG. 12B. The cumulative calculation unit 123 obtains an integration value of all pixels within the rectangular area by the following Equation (2).

$$\text{Integration value} = a - b - c + d \tag{2}$$

Here, a is a pixel value of each column of the integral image data D1, b is a pixel value of each column of the integral image data D1D, c is a pixel value of each column of the integral image data D2, and d is a pixel value of each column of the integral image data D2D.

The cumulative calculation unit 123 sequentially calculates integration values based on the above Equation (2) every time integral image data is input. Thereby, an integration value of all pixels within the rectangular area is output to the processing unit of the image capturing device (not shown) every time a pixel value is read from image data.

Figure 4:
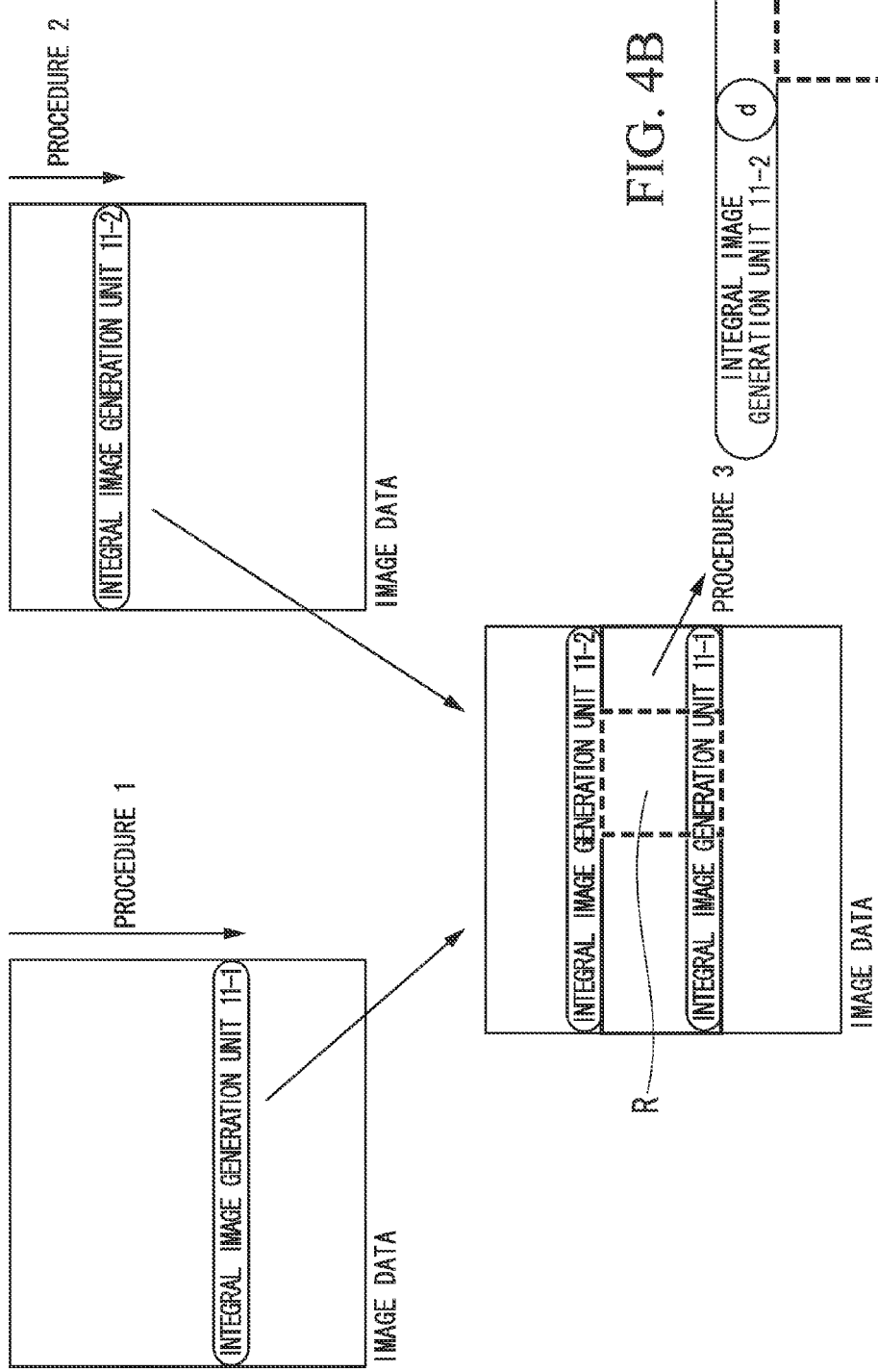
FIGS. 4A and 4B are diagrams illustrating a procedure of an integration process of a rectangular area in the calculation device in accordance with the first preferred embodiment of the present invention.

Next, a procedure of an integration process of a rectangular area in the calculation device of the first preferred embodiment of the present invention will be described. First, a basic procedure when integration values of all pixels within a predetermined rectangular area of image data are obtained will be described using FIGS. 4A and 4B. FIGS. 4A and 4B are diagrams illustrating a procedure of an integration process of the rectangular area in the calculation device in accordance with the first preferred embodiment of the present invention. The calculation device sequentially outputs integration values of all pixels within the rectangular area every time the rectangular area is shifted pixel by pixel in the horizontal and vertical directions. In the following description, the case where integration values are obtained in positions of rectangular areas R shown in FIGS. 4A and 4B will be described.

As described above, in the calculation device, information regarding a size or shape of the rectangular area for which the integration process is performed is set in a pixel unit of the image data by the control unit of the image capturing device (not shown). The information of the rectangular area includes the number of pixels of the horizontal direction and the number of rows of the vertical direction of the rectangular area for which the integration process is performed. Based on the number of pixels of the horizontal direction and the number of rows of the vertical direction of the set rectangular area, the calculation control unit 20 controls the reading of image data stored in the memory unit 2 and inputs read pixel values to the integral image calculation unit 10. The calculation control unit 20 controls the timing of when the integral image generation units 11-1 and 11-2 of the integral image calculation unit 10 start to generate integral image data.

More specifically, if the information of the rectangular area is set, the calculation control unit 20 first sequentially performs a read operation from a pixel value of a first column of a first row of image data stored in the memory unit 2, and inputs a result of the read operation to the integral image generation unit 11-1 as shown in procedure 1 of FIG. 4A.

Simultaneously, the calculation control unit 20 starts an operation of the integral image generation unit 11-1. Thereby, integral image data D1 corresponding to pixels of the first row of the image data is sequentially output from the integral image generation unit 11-1.

The calculation control unit 20 sequentially performs a read operation from a value of a pixel of a first column of the first row of image data stored in the memory unit 2 and inputs a result of the read operation to the integral image generation unit 11-2 as shown in procedure 2 of FIG. 4A after image data to be input to the integral image generation unit 11-1 is completely read by the number of rows of the vertical direction in the rectangular area. Simultaneously, the calculation control unit 20 starts an operation of the integral image generation unit 11-2. Thereby, integral image data D2 corresponding to pixels of the first row of image data is sequentially output from the integral image generation unit 11-2.

Thereafter, the calculation control unit 20 controls an input timing of image data to the integral image generation unit 11-1 and an input timing of image data to the integral image generation unit 11-2 so that the reading of a row of image data input to the integral image generation unit 11-1 and the reading of a row of image data input to the integral image generation unit 11-2 are alternately performed. Also, the calculation control unit 20 controls an operation start timing of the integral image generation unit 11-1 and an operation start timing of the integral image generation unit 11-2 so that the generation of integral image data D1 by the integral image generation unit 11-1 and the generation of integral image data D2 by the integral image generation unit 11-2 are alternately performed.

Also, the calculation control unit 20 controls the timing when the rectangular cumulative calculation unit 12 starts a cumulative calculation based on the number of pixels of the horizontal direction and the number of rows of the vertical direction of the set rectangular area.

More specifically, when the number of rows of read image data to be input to the integral image generation unit 11-1 is the same as the number of rows of the vertical direction in the rectangular area, that is, when the reading of row image data is started in which all pixel values of the rectangular area set by the control unit of the image capturing device (not shown) are aligned, the calculation control unit 20 starts an operation of the rectangular cumulative calculation unit 12. Thereby, as shown in procedure 3 of FIG. 4A, the rectangular cumulative calculation unit 12 sequentially outputs integration values of all pixels within a rectangular area R obtained based on integral image data D1 output from the integral image generation unit 11-1 and integral image data D2 output from the integral image generation unit 11-2 as rectangular cumulative data. FIG. 4B schematically shows a positional relationship between positions of pixels having the pixel values a, b, c, and d of the above Equation (2) and a rectangular area R.

If the operation of the integral image generation unit 11-2 is not started when the rectangular cumulative calculation unit 12 starts to operate, the rectangular cumulative calculation unit 12 obtains integration values of all pixels within the rectangular area R by setting pixel values of the integral image data D2 output from the integral image generation unit 11-2, that is, the pixel values c and d, to "0." This is because, although the operation of the integral image generation unit 11-2 is not started when the calculation control unit 20 starts to control the rectangular cumulative calculation unit 12, all pixel values of the rectangular area are also aligned in this state, and hence the rectangular cumulative calculation unit 12 can obtain the integration values of all the pixels within the rectangular area R. As described above, the operation of the rectangular cumulative calculation unit 12 is started when row image data starts to be read before the operation of the integral image generation unit 11-2 is started.

If the rectangular area R includes a pixel of a first column of image data, there are no pixels in positions corresponding to the pixel values b and d. Accordingly, if a position of the pixel of the first column of the image data is included in the rectangular area R, the rectangular cumulative calculation unit 12 obtains the integration values of all the pixels within the rectangular area R by setting the pixel values b and d to "0."

As described above, the calculation control unit 20 controls image data input timings and operation start timings of the two integral image generation units 11 so that the integral image generation unit 11-1 generates integral image data D1 of a lower row of the rectangular area and the integral image generation unit 11-2 generates integral image data D2 of an upper row of the rectangular area. The calculation control unit 20 outputs integration values of all pixels within the set rectangular area as rectangular cumulative data by controlling the timing when the rectangular cumulative calculation unit 12 starts the cumulative calculation.

Figure 5:
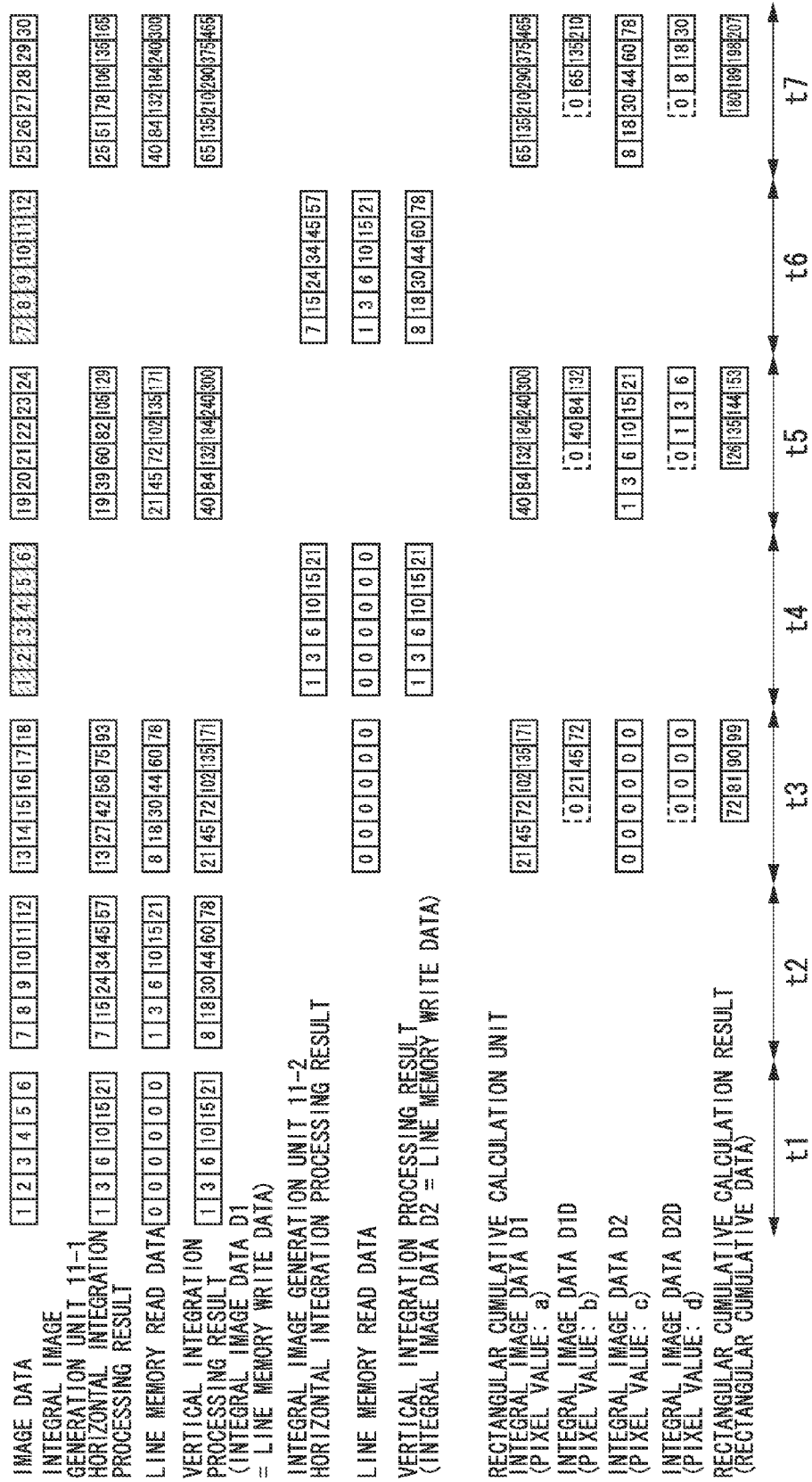
FIG. 5 is a diagram illustrating a timing of an integration process for the rectangular area in the calculation device in accordance with the first preferred embodiment of the present invention.

Here, an example of a specific timing of an integration process for a rectangular area in the calculation device of the first preferred embodiment of the present invention will be described using FIG. 5. FIG. 5 is a diagram illustrating the timing of the integration process for the rectangular area in the calculation device in accordance with the first preferred embodiment of the present invention. In the description of FIG. 5, image data as shown in FIG. 12A is assumed to be stored in the memory unit 2. A rectangular area R where the number of pixels of the horizontal direction is 3 and the number of rows of the vertical direction is 3 as shown in FIG. 12A is assumed to be set by the control unit of the image capturing device (not shown) in the calculation device. The case where the calculation device sequentially outputs integration values of all pixels within the rectangular area R to the processing unit of the image capturing device (not shown) as rectangular cumulative data every time the rectangular area is shifted pixel by pixel in the horizontal and vertical directions will be described.

If information of the rectangular area is set in the calculation device, the calculation control unit 20 first starts an operation of the integral image generation unit 11-1 in period t1. The calculation control unit 20 sequentially performs a read operation from a pixel value "1" of a first column of a first row of image data stored in the memory unit 2, and inputs a result of the read operation to the integral image generation unit 11-1. In FIG. 5, "1," "2," "3," "4," "5," and "6" are sequentially input to the integral image generation unit 11-1 as pixel values.

In the integral image generation unit 11-1, the horizontal integration processing unit 111 sequentially adds input pixel values and sequentially outputs addition results to the vertical integration processing unit 112. In FIG. 5, "1," "3," "6," "10," "15," and "21" are sequentially output to the vertical integration processing unit 112 as values obtained by sequentially adding the pixel values. The vertical integration processing unit 112 adds pixel values sequentially added in the horizontal direction input from the horizontal integration processing unit 111 to pixel values corresponding to input pixels stored in the line memory unit 113, and sequentially outputs addition results to the rectangular cumulative calculation unit 12 as integral image data D1 generated by the integral image generation unit 11-1. Because period t1 is a period of a first row of image data, pixel values stored in the line memory unit 113 are initialized pixel values of "0." Accordingly, in period t1, the pixel values sequentially added in the horizontal direction input from the horizontal integration processing unit 111 ("1," "3," "6," "10," "15," and "21") are sequentially output to the rectangular cumulative calculation unit 12 as integral image data D1. The vertical integration processing unit 112 stores the output integral image data D1 in a corresponding pixel storage area of the line memory unit 113 for each pixel.

Subsequently, in period t2, the calculation control unit 20 sequentially performs read operations from a pixel value "7" of a first column of a second row of the image data stored in the memory unit 2, and inputs results of the read operations to the integral image generation unit 11-1. In FIG. 5, "7," "8," "9," "10," "11," and "12" are sequentially input to the integral image generation unit 11-1 as corresponding pixel values.

In the integral image generation unit 11-1, the horizontal integration processing unit 111 sequentially adds input pixel values and sequentially outputs addition results to the vertical integration processing unit 112. In FIG. 5, "7," "15," "24," "34," "45," and "57" are sequentially output to the vertical integration processing unit 112 as values obtained by sequentially adding the pixel values. The vertical integration processing unit 112 adds pixel values sequentially added in the horizontal direction input from the horizontal integration processing unit 111 to pixel values ("1," "3," "6," "10," "15," and "21") corresponding to input pixels stored in the line memory unit 113, and sequentially outputs addition results to the rectangular cumulative calculation unit 12 as integral image data D1 generated by the integral image generation unit 11-1. In FIG. 5, "8," "18," "30," "44," "60," and "78" are sequentially output to the rectangular cumulative calculation unit 12 as integral image data D1. The vertical integration processing unit 112 stores the output integral image data D1 in a corresponding pixel storage area of the line memory unit 113 for each pixel.

Subsequently, in period t3, the calculation control unit 20 sequentially performs read operations from a pixel value "13" of a first column of a third row of the image data stored in the memory unit 2, and inputs results of the read operations to the integral image generation unit 11-1. In FIG. 5, "13," "14," "15," "16," "17," and "18" are sequentially input to the integral image generation unit 11-1 as corresponding pixel values.

In the integral image generation unit 11-1, the horizontal integration processing unit 111 sequentially adds input pixel values and sequentially outputs addition results to the vertical integration processing unit 112. In FIG. 5, "13," "27," "42," "58," "75," and "93" are sequentially output to the vertical integration processing unit 112 as values obtained by sequentially adding the pixel values. The vertical integration processing unit 112 adds pixel values sequentially added in the horizontal direction input from the horizontal integration processing unit 111 to pixel values ("8," "18," "30," "44," "60," and "78") corresponding to input pixels stored in the line memory unit 113, and sequentially outputs addition results to the rectangular cumulative calculation unit 12 as integral image data D1 generated by the integral image generation unit 11-1. In FIG. 5, "21," "45," "72," "102," "135," and "171" are sequentially output to the rectangular cumulative calculation unit 12 as integral image data D1. The vertical integration processing unit 112 stores the output integral image data D1 in a corresponding pixel storage area of the line memory unit 113 for each pixel.

In period t3, the calculation control unit 20 starts the operation of the rectangular cumulative calculation unit 12. In the rectangular cumulative calculation unit 12, the data delay unit 121 sequentially outputs integral image data D1D, which is obtained by delaying the integral image data D1 sequentially input from the integral image generation unit 11-1 by 3 pixels corresponding to the number of pixels of the horizontal direction of the rectangular area R, to the cumulative calculation unit 123. Also, in the rectangular cumulative calculation unit 12, the cumulative calculation unit 123 sequentially obtains integration values of all pixels within the rectangular area R by substituting pixel values of the input integral image data D1 and integral image data D1D and pixel values "0" of the integral image data D2 and integral image data D2D into the above Equation (2), and sequentially outputs the integration values to the processing unit of the image capturing device (not shown) as rectangular cumulative data, which is a result of the integration process by the calculation processing unit 1, that is, the calculation device. In FIG. 5, integral image data D1 ("21," "45," "72," "102," "135," and "171") as pixel values a, integral image data D1D ("21," "45," and "72") as pixel values b, integral image data D2 (of which all image values are "0") as pixel values c, and integral image data D2D (of which all image values are "0") as pixel values d are substituted into the above Equation (2). Integration values "72," "81," "90," and "99" obtained by the above Equation (2) are sequentially output as rectangular cumulative data.

Subsequently, in period t4, the calculation control unit 20 starts the operation of the integral image generation unit 11-2, sequentially performs read operations from a pixel value "1" of a first column of a first row of image data stored in the memory unit 2, and inputs results of the read operations to the integral image generation unit 11-2. In FIG. 5, "1," "2," "3," "4," "5," and "6" are sequentially input to the integral image generation unit 11-2 as pixel values.

In the integral image generation unit 11-2, the horizontal integration processing unit 111 sequentially adds input pixel values and sequentially outputs addition results to the vertical integration processing unit 112. In FIG. 5, "1," "3," "6," "10," "15," and "21" are sequentially output to the vertical integration processing unit 112 as values obtained by sequentially adding the pixel values. The vertical integration processing unit 112 respectively adds pixel values sequentially added in the horizontal direction input from the horizontal integration processing unit 111 to pixel values corresponding to input pixels stored in the line memory unit 113, and sequentially outputs addition results to the rectangular cumulative calculation unit 12 as integral image data D2 generated by the integral image generation unit 11-2. Because period t4 is a period of a first row of image data in the integral image generation unit 11-2, pixel values stored in the line memory unit 113 are initialized pixel values of "0." Accordingly, in period t4, as in period t1, the pixel values sequentially added in the horizontal direction input from the horizontal integration processing unit 111 ("1," "3," "6," "10," "15," and "21") are also sequentially output to the rectangular cumulative calculation unit 12 as integral image data D2. The vertical integration processing unit 112 stores the output integral image data D2 in a corresponding pixel storage area of the line memory unit 113 for each pixel.

Subsequently, in period t5, the calculation control unit 20 sequentially performs read operations from a pixel value "19" of a first column of a fourth row of the image data stored in the memory unit 2, and inputs results of the read operations to the integral image generation unit 11-1. In FIG. 5, "19," "20," "21," "22," "23," and "24" are sequentially input to the integral image generation unit 11-1 as corresponding pixel values.

In the integral image generation unit 11-1, the horizontal integration processing unit 111 sequentially adds input pixel values and sequentially outputs addition results to the vertical integration processing unit 112. In FIG. 5, "19," "39," "60," "82," "105," and "129" are sequentially output to the vertical integration processing unit 112 as values obtained by sequentially adding the pixel values. The vertical integration processing unit 112 adds pixel values sequentially added in the horizontal direction input from the horizontal integration processing unit 111 to pixel values ("21," "45," "72," "102," "135,", and "171") corresponding to input pixels stored in the line memory unit 113, and sequentially outputs addition results to the rectangular cumulative calculation unit 12 as integral image data D1 generated by the integral image generation unit 11-1. In FIG. 5, "40," "84," "132," "184," "240," and "300" are sequentially output to the rectangular cumulative calculation unit 12 as integral image data D1. The vertical integration processing unit 112 stores the output integral image data D1 in a corresponding pixel storage area of the line memory unit 113 for each pixel.

In the rectangular cumulative calculation unit 12, the data delay unit 121 sequentially outputs integral image data D1D, which is obtained by delaying the integral image data D1 sequentially input from the integral image generation unit 11-1 by 3 pixels corresponding to the number of pixels of the horizontal direction of the rectangular area R, to the cumulative calculation unit 123. The data delay unit 122 sequentially outputs integral image data D2D, which is obtained by delaying the integral image data D2 sequentially input from the integral image generation unit 11-2 by 3 pixels corresponding to the number of pixels of the horizontal direction of the rectangular area R, to the cumulative calculation unit 123. Because an output of the integral image data D1 from the integral image generation unit 11-1 and an output of the integral image data D2 from the integral image generation unit 11-2 are simultaneously processed in period t5, the calculation control unit 20 pre-starts a control operation for reading the integral image data D2 stored in the line memory unit 113 within the integral image generation unit 11-2 in period t4. Thereby, it is possible to input the integral image data D2 to the rectangular cumulative calculation unit 12 simultaneously with the integral image data D1.

Also, in the rectangular cumulative calculation unit 12, the cumulative calculation unit 123 sequentially obtains integration values of all pixels within the rectangular area R by substituting pixel values of the input integral image data D1 and integral image data D1D and pixel values of the integral image data D2 and integral image data D2D into the above Equation (2), and sequentially outputs the integration values to the processing unit of the image capturing device (not shown) as rectangular cumulative data, which is a result of the integration process by the calculation processing unit 1, that is, the calculation device. In FIG. 5, integral image data D1 ("40," "84," "132," "184," "240," and "300") as pixel values a, integral image data D1D ("40," "84," and "132") as pixel values b, integral image data D2 ("1," "3," "6," "10," "15," and "21") as pixel values c, and integral image data D2D ("1," "3," and "6") as pixel values d are substituted into the above Equation (2). Integration values "126," "135," "144," and "153" obtained by the above Equation (2) are sequentially output as rectangular cumulative data.

Subsequently, in period t6, the calculation control unit 20 sequentially performs read operations from a pixel value "7" of a first column of a second row of image data stored in the memory unit 2, and inputs results of the read operations to the integral image generation unit 11-2. In FIG. 5, "7," "8," "9," "10," "11," and "12" are sequentially input to the integral image generation unit 11-2 as corresponding pixel values.

In the integral image generation unit 11-2, the horizontal integration processing unit 111 sequentially adds input pixel values and sequentially outputs addition results to the vertical integration processing unit 112. In FIG. 5, "7," "15," "24," "34," "45," and "57" are sequentially output to the vertical integration processing unit 112 as values obtained by sequentially adding the pixel values. The vertical integration processing unit 112 adds pixel values sequentially added in the horizontal direction input from the horizontal integration processing unit 111 to pixel values ("1," "3," "6," "10," "15," and "21") corresponding to input pixels stored in the line memory unit 113, and sequentially outputs addition results to the rectangular cumulative calculation unit 12 as integral image data D2 generated by the integral image generation unit 11-2. In FIG. 5, "8," "18," "30," "44," "60," and "78" are sequentially output to the rectangular cumulative calculation unit 12 as integral image data D2. The vertical integration processing unit 112 stores the output integral image data D2 in a corresponding pixel storage area of the line memory unit 113 for each pixel.

Subsequently, in period t7, the calculation control unit 20 sequentially performs read operations from a pixel value "25" of a first column of a fifth row of the image data stored in the memory unit 2, and inputs results of the read operations to the integral image generation unit 11-1. In FIG. 5, "25," "26," "27," "28," "29," and "30" are sequentially input to the integral image generation unit 11-1 as corresponding pixel values.

In the integral image generation unit 11-1, the horizontal integration processing unit 111 sequentially adds input pixel values and sequentially outputs addition results to the vertical integration processing unit 112. In FIG. 5, "25," "51," "78," "106," "135," and "165" are sequentially output to the vertical integration processing unit 112 as values obtained by sequentially adding the pixel values. The vertical integration processing unit 112 adds pixel values sequentially added in the horizontal direction input from the horizontal integration processing unit 111 to pixel values ("40," "84," "132," "184," "240," and "300") corresponding to input pixels stored in the line memory unit 113, and sequentially outputs addition results to the rectangular cumulative calculation unit 12 as integral image data D1 generated by the integral image generation unit 11-1. In FIG. 5, "65," "135," "210," "290," "375," and "465" are sequentially output to the rectangular cumulative calculation unit 12 as integral image data D1. The vertical integration processing unit 112 stores the output integral image data D1 in a corresponding pixel storage area of the line memory unit 113 for each pixel.

In the rectangular cumulative calculation unit 12, the data delay unit 121 sequentially outputs integral image data D1D, which is obtained by delaying the integral image data D1 sequentially input from the integral image generation unit 11-1 by 3 pixels corresponding to the number of pixels of the horizontal direction of the rectangular area R, to the cumulative calculation unit 123. The data delay unit 122 sequentially outputs integral image data D2D, which is obtained by delaying the integral image data D2 sequentially input from the integral image generation unit 11-2 by 3 pixels corresponding to the number of pixels of the horizontal direction of the rectangular area R, to the cumulative calculation unit 123. In period t7, as in period t5, the calculation control unit 20 also performs a control operation for inputting the integral image data D2 to the rectangular cumulative calculation unit 12 simultaneously with the integral image data D1.

Also, in the rectangular cumulative calculation unit 12, the cumulative calculation unit 123 sequentially obtains integration values of all pixels within the rectangular area R by substituting pixel values of the input integral image data D1 and integral image data D1D and pixel values of the integral image data D2 and integral image data D2D into the above Equation (2), and sequentially outputs the integration values to the processing unit of the image capturing device (not shown) as rectangular cumulative data, which is a result of the integration process by the calculation processing unit 1, that is, the calculation device. In FIG. 5, integral image data D1 ("65," "135," "210," "290," "375," and "465") as pixel values a, integral image data D1D ("65," "135," and "210") as pixel values b, integral image data D2 ("8," "18," "30," "44," "60," and "78") as pixel values c, and integral image data D2D ("8," "18," and "30") as pixel values d are substituted into the above Equation (2). Integration values "180," "189," "198," and "207" obtained by the above Equation (2) are sequentially output as rectangular cumulative data.

In the calculation device of the first preferred embodiment of the present invention as described above, the two integral image generation units 11 can generate integral images of lower and upper rows of a rectangular area for which an integration process is performed by the calculation processing unit 1. Thereby, it is possible to easily obtain integration values of all pixels within the rectangular area based on the generated integral images.

Second Preferred Embodiment

Figure 6:
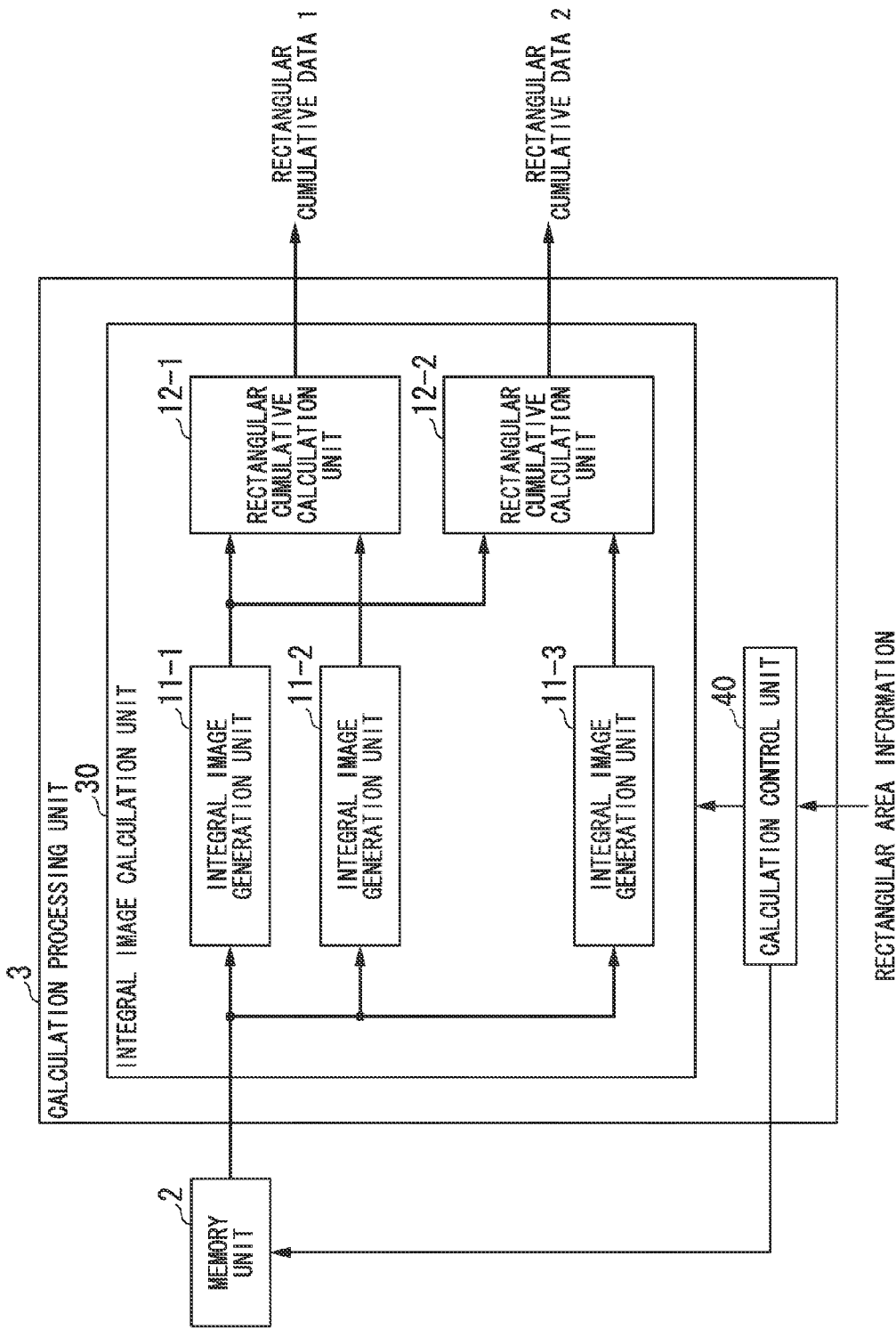
FIG. 6 is a block diagram showing a schematic configuration of the calculation device in accordance with a second preferred embodiment of the present invention.

Hereinafter, a calculation device in accordance with the second preferred embodiment of the present invention will be described. FIG. 6 is a block diagram showing a schematic configuration of the calculation device in accordance with the second preferred embodiment of the present invention. The calculation device shown in FIG. 6 includes a calculation processing unit 3 and a memory unit 2. The calculation processing unit 3 includes an integral image calculation unit 30 and a calculation control unit 40. The integral image calculation unit 30 includes three integral image generation units 11-1 to 11-3 and two rectangular cumulative calculation units 12-1 and 12-2.

The calculation device according to the second preferred embodiment of the present invention shown in FIG. 6 includes the calculation processing unit 3 in place of the calculation processing unit 1 within the calculation device according to the first preferred embodiment shown in FIG. 1. The calculation processing unit 3 includes the integral image calculation unit 30 and the calculation control unit 40 in place of the integral image calculation unit 10 and the calculation control unit 20 within the calculation processing unit 1 of the first preferred embodiment shown in FIG. 1. As compared with the integral image calculation unit 10 of the first preferred embodiment shown in FIG. 1, the integral image calculation unit 30 additionally includes the integral image generation unit 11-3 and the rectangular cumulative calculation unit 12-2.

The rectangular cumulative calculation unit 12-1 within the integral image calculation unit 30 is only denoted by the reference numeral different from that of the rectangular cumulative calculation unit 12 within the integral image calculation unit 10 of the first preferred embodiment shown in FIG. 1. Because the operations of the rectangular cumulative calculation units 12-1 and 12-2 are the same as that of the rectangular cumulative calculation unit 12 within the calculation device of the first preferred embodiment shown in FIG. 1, a detailed description thereof is omitted here. Because the operation of the integral image generation unit 11-3 is the same as those of the integral image generation units 11-1 and 11-2 included in the calculation device according to the first preferred embodiment shown in FIG. 1, a detailed description thereof is omitted here. The components of the calculation device according to the second preferred embodiment of the present invention having the same operations as the components of the calculation device according to the first preferred embodiment shown in FIG. 1 are denoted by the same reference numerals, and a detailed description thereof is omitted here. In the following description, only operations different from those of the calculation device according to the first preferred embodiment will be described.

Like the calculation processing unit 1 shown in FIG. 1, the calculation processing unit 3 generates an integral image of image data input from the memory unit 2. The calculation processing unit 3 performs an integration process, which obtains integration values of all pixels within a predetermined rectangular area set by a control unit of an image capturing device (not shown) based on the generated integral image. The calculation processing unit 3 outputs data of a result of the integration process as rectangular cumulative data. In this regard, the calculation processing unit 3 outputs rectangular cumulative data (rectangular cumulative data 1 and 2) for two rectangular areas set by the control unit of the image capturing device (not shown).

Figures 7A, 7B:
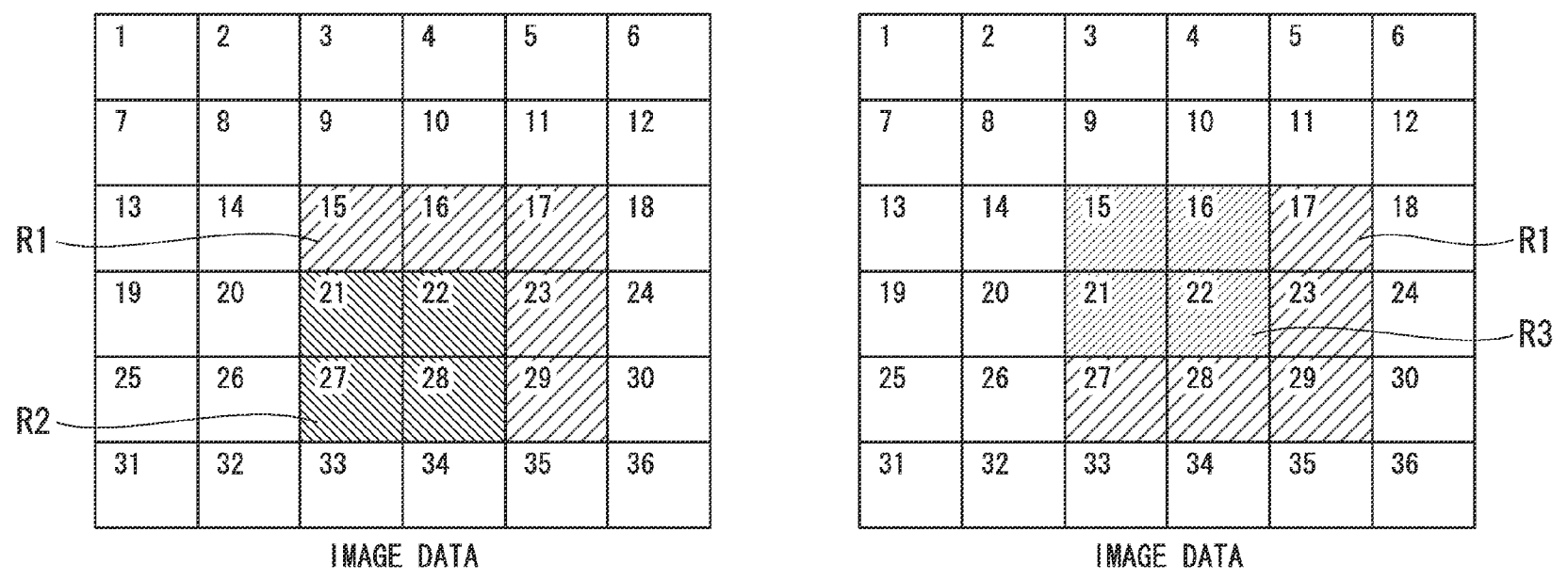

First, the two rectangular areas set by the control unit of the image capturing device (not shown) will be described. FIGS. 7A and 7B are diagrams schematically showing examples of rectangular areas of image data for which integration processes are performed in the calculation device in accordance with the second preferred embodiment of the present invention. In the calculation device of the second preferred embodiment of the present invention, the same rectangular area R1 as the rectangular area R set in the calculation device of the first preferred embodiment is set as a first rectangular area as shown in FIGS. 7A and 7B. Either a rectangular area R2 having lower rows in common with the rectangular area R1 as shown in FIG. 7A or a rectangular area R3 having upper rows in common with the rectangular area R1 as shown in FIG. 7B is set as a second rectangular area.

Even when the rectangular areas R1 and R3 are set by the control unit of the image capturing device (not shown) as shown in FIG. 7B, an area of the rectangular area R3 is the same as that of the rectangular area R2 shown in FIG. 7A. Thus, it is also possible to perform the same process in this case as in the case where the rectangular areas R1 and R2 are set by the control unit of the image capturing device (not shown) as shown in FIG. 7A. Accordingly, the case where the rectangular areas R1 and R2 are set by the control unit of the image capturing device (not shown) as shown in FIG. 7A will be described below.

The calculation control unit 40 outputs control signals for controlling the reading of image data stored in the memory unit 2 and the integration process by the integral image calculation unit 30 to the memory unit 2 and the integral image calculation unit 30 based on information of the two rectangular areas for which the integration processes are performed set by the control unit of the image capturing device (not shown). In the calculation control unit 40, for example, information regarding sizes or shapes of the two rectangular areas within the image data is set in a pixel unit of the image data. The information of the rectangular areas includes the number of pixels of the horizontal direction and the number of rows of the vertical direction for each of the two rectangular areas for which the integration processes are performed. Based on the information of each rectangular area set in the pixel unit, the calculation control unit 40 controls the timing when the image data is read from the memory unit 2 and is input to the integral image calculation unit 30 and the timings of integral image generation and cumulative calculation by the integral image calculation unit 30. Timing control in the calculation control unit 40 will be described later.

The integral image calculation unit 30 generates the integral image of the image data input from the memory unit 2 in response to an integration process control signal input from the calculation control unit 40. The integral image calculation unit 30 carries out a cumulative calculation on the rectangular area based on the generated integral image in response to the integration process control signal input from the calculation control unit 40. The integral image calculation unit 30 outputs data of results of cumulative calculations on the two rectangular areas performed by the integral image calculation unit 30 to a processing unit of the image capturing device (not shown) as rectangular cumulative data 1 and 2, which are the results of the integration processes performed by the calculation processing unit 3.

In the integral image calculation unit 30, the rectangular cumulative calculation unit 12-1 carries out a cumulative calculation on image data based on integral image data D1 generated by the integral image generation unit 11-1 and integral image data D2 generated by the integral image generation unit 11-2, and outputs data of a cumulative calculation result as the rectangular cumulative data 1. The rectangular cumulative calculation unit 12-2 carries out a cumulative calculation on image data based on integral image data D1 generated by the integral image generation unit 11-1 and integral image data generated by the integral image generation unit 11-3 (hereinafter referred to as "integral image data D3"), and outputs data of a cumulative calculation result as the rectangular cumulative data 2. As in the rectangular cumulative calculation unit 12 included in the calculation processing unit 1 within the calculation device of the first preferred embodiment shown in FIG. 3, the cumulative calculations of the rectangular cumulative calculation units 12-1 and 12-2 are carried out by substituting pixel values of each integral image data into the above Equation (2).

Next, a procedure of an integration process for each rectangular area in the calculation device of the second preferred embodiment of the present invention will be described. FIG. 8 is a diagram illustrating procedures of integration processes on rectangular areas R1 and R2 in the calculation device in accordance with the second preferred embodiment of the present invention. The calculation device sequentially outputs integration values of all pixels within each rectangular area every time the rectangular area is shifted pixel by pixel in horizontal and vertical directions. The case where integration values are obtained in positions of the rectangular areas R1 and R2 shown in FIG. 7A will be described below. Because a positional relationship between pixel positions having pixel values a, b, c, and d to be substituted into the above Equation (2) when integration values are obtained in positions of the rectangular areas R1 and R2 and the rectangular area R1 or R2 is the same as the relationship shown in FIG. 4B, a detailed description thereof is omitted here.

In the calculation device of the second preferred embodiment of the present invention, the rectangular cumulative calculation unit 12-2 carries out a cumulative calculation on the rectangular area R1 and the rectangular cumulative calculation unit 12-1 carries out a cumulative calculation on the rectangular area R2. If information of the two rectangular areas R1 and R2 is set, the calculation control unit 40 first sequentially performs a read operation from a pixel value of a first column of a first row of image data stored in the memory unit 2, and inputs a result of the read operation to the integral image generation unit 11-1 as shown in procedure 1 of FIG. 8. Simultaneously, an operation of the integral image generation unit 11-1 is started. Thereby, integral image data D1 corresponding to pixels of the first row of image data is sequentially output from the integral image generation unit 11-1.

When the number of rows of read image data to be input to the integral image generation unit 11-1 is the same as the number of rows of the vertical direction in the rectangular area, that is, when the reading of row image data is started in which all pixel values of the rectangular area R2 set by the control unit of the image capturing device (not shown) are aligned, the calculation control unit 40 starts an operation of the rectangular cumulative calculation unit 12-1. Thereby, the rectangular cumulative calculation unit 12-1 obtains integration values of all pixels within the rectangular area R2 in which pixel values of the integral image data D2 output from the integral image generation unit 11-2 are "0," and outputs the integration values as the rectangular cumulative data 1.

Thereafter, the calculation control unit 40 sequentially performs a read operation from a value of a pixel of a first column of the first row of image data stored in the memory unit 2 and inputs a result of the read operation to the integral image generation unit 11-2 as shown in procedure 2 of FIG. 8 after image data to be input to the integral image generation unit 11-1 is completely read by the number of rows of the vertical direction in the rectangular area R2. Simultaneously, the calculation control unit 40 starts an operation of the integral image generation unit 11-2. Thereby, integral image data D2 corresponding to pixels of the first row of image data is sequentially output from the integral image generation unit 11-2.

The calculation control unit 40 starts the operation of the rectangular cumulative calculation unit 12-1, so that the integration values of all the pixels within the rectangular area R2 based on the integral image data D1 output from the integral image generation unit 11-1 and the integral image data D2 output from the integral image generation unit 11-2 are output from the rectangular cumulative calculation unit 12-1 as the rectangular cumulative data 1.

Thereafter, the calculation control unit 40 controls input timings of image data to the integral image generation units 11-1 and 11-2 so that the reading of a row of image data input to the integral image generation unit 11-1 and the reading of a row of image data input to the integral image generation unit 11-2 are alternately performed. Also, the calculation control unit 40 controls operation start timings of the integral image generation units 11-1 and 11-2 so that the generation of integral image data D1 by the integral image generation unit 11-1 and the generation of integral image data D2 by the integral image generation unit 11-2 are alternately performed.

The calculation control unit 40 starts the operation of the rectangular cumulative calculation unit 12-1, so that integration values of all pixels within a rectangular area R2 obtained based on integral image data D1 output from the integral image generation unit 11-1 and integral image data D2 output from the integral image generation unit 11-2 are sequentially output from the rectangular cumulative calculation unit 12-1 as rectangular cumulative data 1 as shown in procedure 3 of FIG. 8.

Thereafter, when the number of rows of read image data to be input to the integral image generation unit 11-1 is the same as the number of rows of the vertical direction in the rectangular area R1, that is, when the reading of row image data is started in which all pixel values of the rectangular area R1 set by the control unit of the image capturing device (not shown) are aligned, the calculation control unit 40 starts an operation of the rectangular cumulative calculation unit 12-2. Thereby, the rectangular cumulative calculation unit 12-2 obtains integration values of all pixels within the rectangular area R1 in which pixel values of the integral image data D3 output from the integral image generation unit 11-3 are "0," and outputs the integration values as the rectangular cumulative data 2. At this time, because the calculation control unit 40 has already started the operation of the rectangular cumulative calculation unit 12-1, the rectangular cumulative data 1 corresponding to the rectangular area R2 is also output from the rectangular cumulative calculation unit 12-1.

Thereafter, when the number of rows of read image data to be input to the integral image generation unit 11-1 is the same as the number of rows of the vertical direction in the rectangular area R1, the calculation control unit 40 sequentially performs a read operation from a pixel value of a first column of a first row of image data stored in the memory unit 2 subsequently to the reading of image data to be input to the integral image generation unit 11-2, and inputs a result of the read operation to the integral image generation unit 11-3 as shown in procedure 4 of FIG. 8. Simultaneously, an operation of the integral image generation unit 11-3 is started. Thereby, integral image data D3 corresponding to pixels of the first row of the image data is sequentially output from the integral image generation unit 11-3.

The calculation control unit 40 starts the operation of the rectangular cumulative calculation unit 12-2, so that the integration values of all the pixels within the rectangular area R1 based on the integral image data D1 output from the integral image generation unit 11-1 and the integral image data D3 output from the integral image generation unit 11-3 are output from the rectangular cumulative calculation unit 12-2 as the rectangular cumulative data 2. At this time, because the calculation control unit 40 has also started the operation of the rectangular cumulative calculation unit 12-1, the rectangular cumulative data 1 corresponding to the rectangular area R2 is also output from the rectangular cumulative calculation unit 12-1.

Thereafter, the calculation control unit 40 controls input timings of image data to the integral image generation units 11-1 to 11-3 so that the reading of a row of image data input to the integral image generation unit 11-1, the reading of a row of image data input to the integral image generation unit 11-2, and the reading of a row of image data input to the integral image generation unit 11-3 are alternately performed. Also, the calculation control unit 40 controls operation start timings of the integral image generation units 11-1 to 11-3 so that the generation of integral image data D1 by the integral image generation unit 11-1, the generation of integral image data D2 by the integral image generation unit 11-2, and the generation of integral image data D3 by the integral image generation unit 11-3 are alternately performed.

The calculation control unit 40 starts the operation of the rectangular cumulative calculation unit 12-2, so that integration values of all pixels within the rectangular area R1 obtained based on the integral image data D1 output from the integral image generation unit 11-1 and the integral image data D3 output from the integral image generation unit 11-3 are sequentially output from the rectangular cumulative calculation unit 12-2 as rectangular cumulative data 2 as shown in procedure 5 of FIG. 8. At this time, because the calculation control unit 40 has also started the operation of the rectangular cumulative calculation unit 12-1, the rectangular cumulative data 1 corresponding to the rectangular area R2 is also output from the rectangular cumulative calculation unit 12-1.

As described above, the calculation control unit 40 causes the integral image generation unit 11-1 to generate integral image data D1 of lower rows of the rectangular areas R1 and R2. The calculation control unit 40 causes the integral image generation unit 11-2 to generate integral image data D2 of an upper row of the rectangular area R2, and causes the integral image generation unit 11-3 to generate integral image data D3 of an upper row of the rectangular area R1. As described above, the calculation control unit 40 controls image data input timings and operation start timings of the three integral image generation units 11. The calculation control unit 40 outputs the rectangular cumulative data 1 corresponding to the set rectangular area R2 and the rectangular cumulative data 2 corresponding to the rectangular area R1 by controlling the timing when the rectangular cumulative calculation units 12-1 and 12-2 start cumulative calculations.

Figure 9:
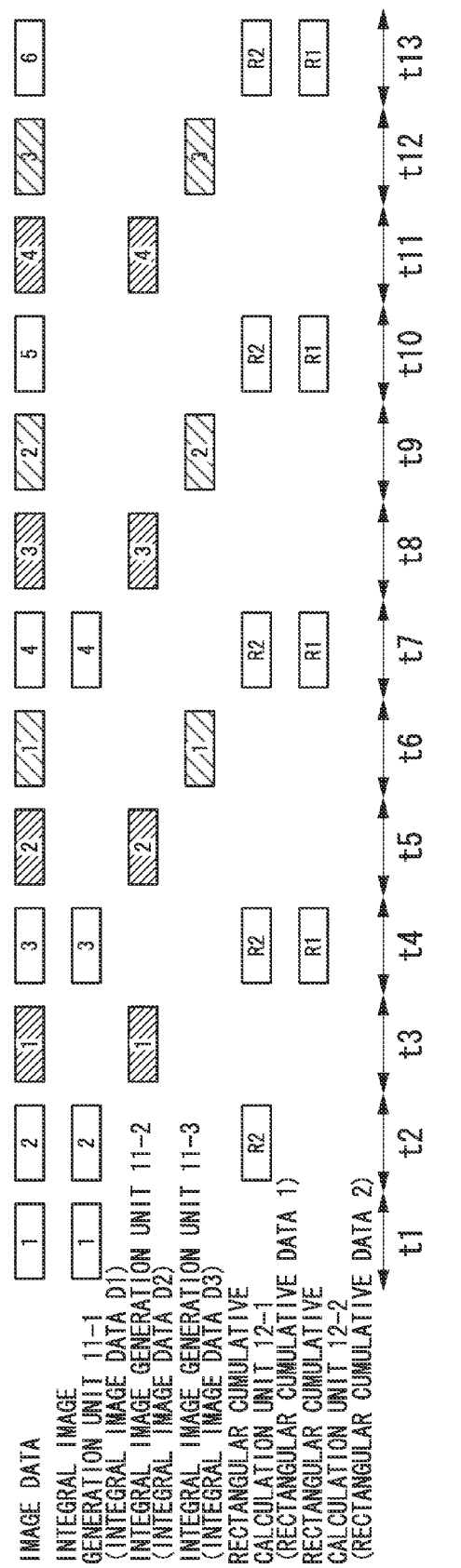
FIG. 9 is a diagram illustrating the timing of the integration process for the rectangular area in the calculation device in accordance with the second preferred embodiment of the present invention.
Figure 10A:
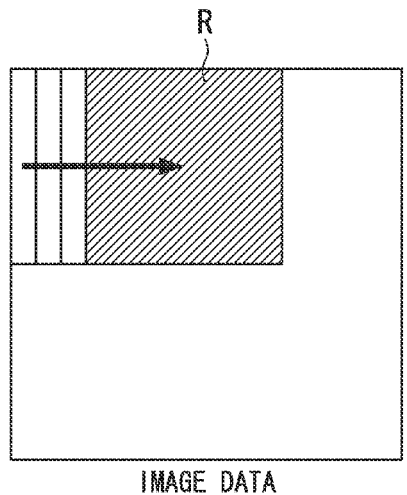
FIGS. 10A to 10D are diagrams schematically showing a state in which a rectangular area is shifted in image processing performed by integrating pixel values while shifting the rectangular area in accordance with the related art.
Figure 10B:
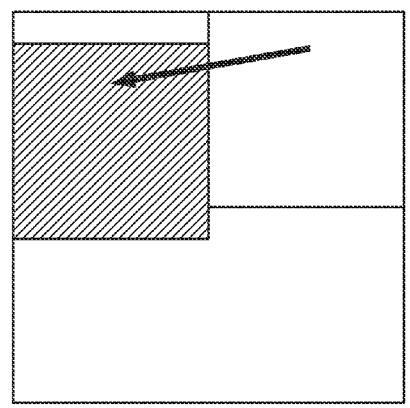
Figure 10C:
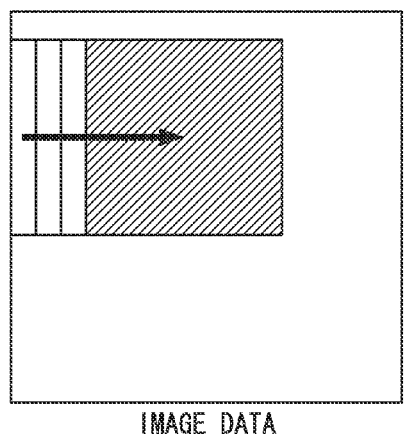
Figure 10D:
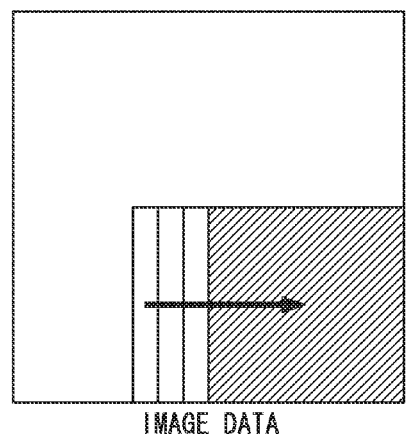

Here, an example of a specific timing of an integration process for a rectangular area in the calculation device according to the second preferred embodiment of the present invention will be described using FIG. 9. FIG. 9 is a diagram illustrating the timing of the integration process for the rectangular area in the calculation device in accordance with the second preferred embodiment of the present invention. In the description of FIG. 9, image data of 6 rows and 6 columns as shown in FIG. 7A is assumed to be stored in the memory unit 2. Two rectangular areas R1 and R2 as shown in FIG. 7A are assumed to be set by the control unit of the image capturing device (not shown). In FIG. 9, only row numbers of image data of which the reading is controlled by the calculation control unit 40 are shown. The case where the calculation device sequentially outputs integration values of all pixels within the rectangular areas R1 and R2 to the processing unit of the image capturing device (not shown) as rectangular cumulative data 1 and 2 every time the rectangular areas R1 and R2 are shifted pixel by pixel in the horizontal and vertical directions will be described.

If information of the two rectangular areas R1 and R2 is set in the calculation device, the calculation control unit 40 first starts an operation of the integral image generation unit 11-1, sequentially reads pixel values of a first row of image data stored in the memory unit 2, and inputs the read pixel values to the integral image generation unit 11-1 in period t1. The integral image generation unit 11-1 sequentially outputs integral image data D1 generated based on the input pixel values to the rectangular cumulative calculation units 12-1 and 12-2.

Subsequently, in period t2, the calculation control unit 40 sequentially reads pixel values of a second row of the image data stored in the memory unit 2, and inputs the read pixel values to the integral image generation unit 11-1. The integral image generation unit 11-1 sequentially outputs integral image data D1 generated based on the input pixel values to the rectangular cumulative calculation units 12-1 and 12-2. In period t2, the calculation control unit 40 starts the operation of the rectangular cumulative calculation unit 12-1. Thereby, the rectangular cumulative calculation unit 12-1 carries out a cumulative calculation by setting pixel values of integral image data D2 output from the integral image generation unit 11-2 to "0," and sequentially outputs rectangular cumulative data 1 corresponding to the rectangular area R2.

Subsequently, in period t3, the calculation control unit 40 starts the operation of the integral image generation unit 11-2, sequentially reads pixel values of a first row of image data stored in the memory unit 2, and inputs the read pixel values to the integral image generation unit 11-2. The integral image generation unit 11-2 sequentially outputs integral image data D2 generated based on the input pixel values to the rectangular cumulative calculation unit 12-1.

Subsequently, in period t4, the calculation control unit 40 sequentially reads pixel values of a third row of image data stored in the memory unit 2, and inputs the read pixel values to the integral image generation unit 11-1. The integral image generation unit 11-1 sequentially outputs integral image data D1 generated based on the input pixel values to the rectangular cumulative calculation units 12-1 and 12-2.

In period t4, the calculation control unit 40 starts the operation of the rectangular cumulative calculation unit 12-1. Thereby, the rectangular cumulative calculation unit 12-1 carries out a cumulative calculation based on integral image data D1 output from the integral image generation unit 11-1 and integral image data D2 output from the integral image generation unit 11-2, and sequentially outputs rectangular cumulative data 1 corresponding to the rectangular area R2. Because the output of the integral image data D1 from the integral image generation unit 11-1 and the output of the integral image data D2 from the integral image generation unit 11-2 are simultaneously processed in period t4, the calculation control unit 40 performs a control operation for inputting the integral image data D2 to the rectangular cumulative calculation unit 12 simultaneously with the integral image data D1.

In period t4, the calculation control unit 40 starts the operation of the rectangular cumulative calculation unit 12-2. Thereby, the rectangular cumulative calculation unit 12-2 carries out a cumulative calculation by setting pixel values of integral image data D3 output from the integral image generation unit 11-3 to "0," and sequentially outputs rectangular cumulative data 2 corresponding to the rectangular area R1.

Subsequently, in period t5, the calculation control unit 40 starts an operation of the integral image generation unit 11-2, sequentially reads pixel values of a second row of image data stored in the memory unit 2, and inputs the read pixel values to the integral image generation unit 11-2. The integral image generation unit 11-2 sequentially outputs integral image data D2 generated based on the input pixel values to the rectangular cumulative calculation unit 12-1.

Subsequently, in period t6, the calculation control unit 40 starts an operation of the integral image generation unit 11-3, sequentially reads pixel values of a first row of image data stored in the memory unit 2, and inputs the read pixel values to the integral image generation unit 11-3. The integral image generation unit 11-3 sequentially outputs integral image data D3 generated based on the input pixel values to the rectangular cumulative calculation unit 12-2.

Subsequently, in period t7, the calculation control unit 40 sequentially reads pixel values of a fourth row of image data stored in the memory unit 2, and inputs the read pixel values to the integral image generation unit 11-1. The integral image generation unit 11-1 sequentially outputs integral image data D1 generated based on the input pixel values to the rectangular cumulative calculation units 12-1 and 12-2.

In period t7, the calculation control unit 40 starts an operation of the rectangular cumulative calculation unit 12-1. Thereby, the rectangular cumulative calculation unit 12-1 carries out a cumulative calculation based on integral image data D1 output from the integral image generation unit 11-1 and integral image data D2 output from the integral image generation unit 11-2, and sequentially outputs rectangular cumulative data 1 corresponding to the rectangular area R2. In period t7, as in period t4, the calculation control unit 40 also performs a control operation for inputting the integral image data D2 to the rectangular cumulative calculation unit 12-1 simultaneously with the integral image data D1.

In period t7, the calculation control unit 40 starts an operation of the rectangular cumulative calculation unit 12-2. Thereby, the rectangular cumulative calculation unit 12-2 carries out a cumulative calculation based on integral image data D1 output from the integral image generation unit 11-1 and integral image data D3 output from the integral image generation unit 11-3, and sequentially outputs rectangular cumulative data 2 corresponding to the rectangular area R1. Because the output of the integral image data D1 from the integral image generation unit 11-1 and the output of the integral image data D3 from the integral image generation unit 11-3 are simultaneously processed in period t7, the calculation control unit 40 performs a control operation for inputting the integral image data D3 to the rectangular cumulative calculation unit 12 simultaneously with the integral image data D1.

Thereafter, likewise, the calculation control unit 40 controls input timings of image data to the integral image generation units 11-1 to 11-3 so that the reading of a row of image data input to the integral image generation unit 11-1, the reading of a row of image data input to the integral image generation unit 11-2, and the reading of a row of image data input to the integral image generation unit 11-3 are alternately performed. Also, the calculation control unit 40 controls operation start timings of the integral image generation units 11-1 to 11-3 so that the generation of integral image data D1 by the integral image generation unit 11-1, the generation of integral image data D2 by the integral image generation unit 11-2, and the generation of integral image data D3 by the integral image generation unit 11-3 are alternately performed.

The calculation control unit 40 starts the operations of the rectangular cumulative calculation units 12-1 and 12-2 in a period in which pixel values are read to the integral image generation unit 11-1. Thereby, the rectangular cumulative calculation unit 12-1 sequentially outputs rectangular cumulative data 1 corresponding to the rectangular area R2, and the rectangular cumulative calculation unit 12-2 sequentially outputs rectangular cumulative data 2 corresponding to the rectangular area R1.

As described above, the calculation device of the second preferred embodiment of the present invention can generate integral images corresponding to two rectangular areas for which integration processes are performed by three integral image generation units 11. Thereby, it is possible to easily obtain integration values of all pixels within the two rectangular areas based on the generated integral images.

The case where three integral image generation units 11 are included to carry out integration calculations on two rectangular areas in the calculation device of the second preferred embodiment has been described. It is possible to carry out integration calculations on more rectangular areas by adding one integral image generation unit 11 every time the number of rectangular areas for performing the integration calculations is incremented by 1.

According to an preferred embodiment of the present invention as described above, it is possible to generate an integral image by reading and inputting pixel values of image data to each of the two integral image generation units once with respect to one rectangular area for which an integration process is performed, that is, by only reading and inputting the entire image data twice, by the calculation control unit 20. It is possible to generate integral images corresponding to a plurality of rectangular areas by only additionally reading the entire image data once every time one rectangular area is added for which the integration process is performed without setting the number of times of reading the image data to a higher number. Thereby, the number of memory accesses to a memory storing image data is reduced as compared with the case where image data is read every time to perform the integration process.

According to the preferred embodiment of the present invention, it is possible to sequentially generate an integral image including pixel values necessary for the integration process every time pixel values of image data are input to the integral image generation unit. Thereby, it is possible to reduce a circuit scale of a memory because it is not necessary to prepare a memory having a large storage capacity for storing an additional integral image.

According to the preferred embodiment of the present invention, it is possible to easily change the height of a rectangular area for which the integration process is performed (the number of rows of the vertical direction) by controlling the timing of reading image data a second time (the timing of reading image data for generating an integral image of an upper row of the rectangular area for which the integration process is performed). Also, it is possible to easily change the width of the rectangular area, that is, the number of pixels of the horizontal direction. Thereby, it is possible to eliminate the limit of a height of the rectangular area for which the integration process is performed and easily change the size of the rectangular area for which the integration process is performed.

The case where integration values of all pixels within a rectangular area are obtained while the rectangular area for the integration process is shifted pixel by pixel in the horizontal and vertical directions as shown in FIGS. 10A to 10D has been described in the preferred embodiment of the present invention. However, a method of shifting the rectangular area is not limited to the preferred embodiment of the present invention. For example, it is also possible to apply the present invention to the case where the rectangular area is shifted by one pixel in the horizontal direction and thereafter the rectangular area is re-shifted row by row in the vertical direction, after the rectangular area is initially shifted row by row in the vertical direction and an integration of pixel values is completed for one column of image data, that is, after the rectangular area is shifted to the last pixel position of a first column of the image data. In this case, for example, the horizontal integration processing unit 111 shown in FIG. 2 sequentially adds pixel values of image data for each column of the vertical direction of the image data and the vertical integration processing unit 112 adds pixel values sequentially added in the vertical direction to corresponding pixel values stored in the line memory unit 113, and hence handling thereof is possible. In this case, it is also not necessary to change the components of the present invention, for example, because only an operation of controlling the reading of image data by the calculation control unit 20 is different.

An example in which the calculation control unit 20 alternately switches image data to be input to the integral image generation unit 11-1 and image data to be input to the integral image generation unit 11-2 for each row has been described in the preferred embodiment of the present invention. However, a method of inputting pixel values of image data to the integral image generation unit 11 is not limited to the preferred embodiment of the present invention. For example, pixel values of image data to be input to the integral image generation units 11-1 and 11-2 can be alternately switched for each pixel.

The case where the calculation control unit 20 or 40 controls the reading of image data to be input to the integral image generation unit 11 and the timing of a cumulative calculation based on a predetermined rectangular area set by the control unit of the image capturing device (not shown) has been described in the preferred embodiment of the present invention. However, the present invention is not limited to this preferred embodiment. For example, the control unit of the image capturing device (not shown) can be configured to control the reading of image data to be input to the integral image generation unit 11 and the timing of a cumulative calculation.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the invention is not to be considered as being limited by the foregoing description, and is only limited by the scope of the claims.

What is claimed is:

1. A calculation device comprising:
   a data read unit configured to sequentially read pixel values, which are included in an image data group formed by a plurality of pixel values two-dimensionally arranged in first and second directions, in the first direction while sequentially making a shift in the second direction from a position of a reference pixel in the first and second directions;
   a first data integration unit configured to output a sum of values of pixels, which are included in a rectangular area in which pixels in the position of the reference pixel and a first position of the second direction sequentially read by the data read unit are designated as vertices, as a first integration value;
   a second data integration unit configured to output a sum of values of pixels, which are included in a rectangular area in which pixels in the position of the reference pixel and a second position of the second direction sequentially read by the data read unit are designated as vertices, as a second integration value; and
   a data cumulative calculation unit configured to obtain a cumulative value by accumulating pixel values respectively included in a first rectangular data area expressed by a first number of pixels in the first direction and a second number of pixels in the second direction based on the first integration value output from the first data integration unit and the second integration value output from the second data integration unit,
   wherein the cumulative values of the plurality of pixel values included in the first rectangular data area when the first rectangular data area is sequentially shifted in the second direction while the first rectangular data area is sequentially shifted in the first direction are sequentially output.

2. The calculation device according to claim 1, wherein each of the first and second data integration units comprises:
   a first integration unit configured to sequentially output integration values of pixel values from the position of the reference pixel in the first direction to a position of a pixel currently read in the first direction as integration values of the first direction;
   a second integration unit configured to sequentially output integration values of the second direction by adding integration values of the first direction previously obtained by integration calculations of the first integration unit to integration values of the first direction currently obtained by integration calculations of the first integration unit after a position of a pixel from which a pixel value is read by the data read unit is shifted in the second direction; and
   an integration value storage unit configured to store an integration value of the second direction corresponding to each pixel position as a previous integration value,
   wherein the integration values of the second direction are respectively output as the first integration value output by the first data integration unit and the second integration value output by the second data integration unit.

3. The calculation device according to claim 1, wherein the data cumulative calculation unit comprises:
   a first data delay unit configured to delay the first integration value obtained by an integration calculation of the first data integration unit by the first number of pixels in the first rectangular data area;
   a second data delay unit configured to delay the second integration value obtained by an integration calculation of the second data integration unit by the first number of pixels in the first rectangular data area; and
   a cumulative calculation unit configured to calculate a cumulative value by accumulating a plurality of pixel values included in the first rectangular area based on the first integration value, an integration value after the first integration value is delayed by the first data delay unit, the second integration value, and an integration value after the second integration value is delayed by the second data delay unit.

4. The calculation device according to claim 1, wherein:
   the first integration value is an integration value of a lower side in the rectangular area, and
   the second integration value is an integration value of an upper side in the rectangular area.

5. The calculation device according to claim 4, wherein the data read unit:
   starts to read pixel values from the position of the reference pixel to input the read pixel values to the first data integration unit by controlling a read operation to be performed again in the first direction from a value of a pixel when the first position is shifted from the position of the reference pixel in the second direction after the pixel values are completely read by the first number of pixels in the first direction,
   inputs read pixel values to the second data integration unit by starting to read the pixel values from the position of the reference pixel after the first position is shifted by the second number of pixels in the first rectangular data area, and then
   controls the reading of the image data group so that the reading of the pixel values to be input to the first data integration unit and the reading of the pixel values to be input to the second data integration unit are alternately performed.

6. The calculation device according to claim 5, wherein the data read unit:
   starts to read the pixel values to be input to the second data integration unit in the second position from the pixel value of the position of the reference pixel in the image data group after the first position is shifted by the second number of pixels in the first rectangular data area from a start of the reading of the pixel values to be input to the first data integration unit and the reading of all pixel values including a pixel value of the first position is completed, and then
   alternately performs the reading of pixel values of the first direction in the next first position to be input to the first data integration unit and the reading of pixel values of the first direction in the next second position to be input to the second data integration unit every time the reading of all pixel values of the first direction included in the image data group is completed.

7. The calculation device according to claim 6, further comprising:
   a third data integration unit configured to output a sum of values of pixels, which are included in a rectangular area in which the position of the reference pixel and each pixel of a third position of the second direction sequentially read by the data read unit are designated as vertices, as a third integration value; and a data cumulative calculation unit configure to obtain a cumulative value by accumulating pixel values respectively included in a second rectangular data area expressed by a third number of pixels in the first direction and a fourth number of pixels in the second direction based on the first integration value output from the first data integration unit and the third integration value output from the third data integration unit, wherein the data read unit:

inputs read pixel values to the third data integration unit by starting to read the pixel values from the position of the reference pixel after the third position is shifted by the fourth number of pixels in the second rectangular data area, and then controls the reading of the image data group so that the reading of the pixel values to be input to the first data integration unit, the reading of the pixel values to be input to the second data integration unit, and the reading of the pixel values to be input to the third data integration unit are alternately performed, the data cumulative calculation unit comprises:

a third data delay unit configured to delay the first integration value obtained by an integration calculation of the first data integration unit by the third number of pixels in the second rectangular data area;

a fourth data delay unit configured to delay the third integration value obtained by an integration calculation of the third data integration unit by the fourth number of pixels in the second rectangular data area; and a second cumulative calculation unit configured to calculate a second cumulative value by accumulating a plurality of pixel values included in the second rectangular area based on the first integration value, an integration value after the first integration value is delayed by the third data delay unit, and the third integration value, and an integration value after the third integration value is delayed by the fourth data delay unit, and the calculation device further sequentially outputs the second cumulative values of the plurality of pixel values included in the second rectangular data area when the second rectangular data area is sequentially shifted in the second direction while the second rectangular data area is sequentially shifted in the first direction along with the first rectangular area.

8. A calculation method comprising:

a data read step of sequentially reading pixel values, which are included in an image data group formed by a plurality of pixel values two-dimensionally arranged in first and second directions, in the first direction while sequentially making a shift in the second direction from a position of a reference pixel in the first and second directions;

a first data integration step of outputting a sum of values of pixels, which are included in a rectangular area in which pixels in the position of the reference pixel and a first position of the second direction sequentially read by the data read step are designated as vertices, as a first integration value;

a second data integration step of outputting a sum of values of pixels, which are included in a rectangular area in which pixels in the position of the reference pixel and a second position of the second direction sequentially read by the data read step are designated as vertices, as a second integration value; and a data cumulative calculation step of obtaining a cumulative value by accumulating pixel values respectively included in a first rectangular data area expressed by a first number of pixels in the first direction and a second number of pixels in the second direction based on the first integration value output by the first data integration step and the second integration value output by the second data integration step, wherein the cumulative values of the plurality of pixel values included in the first rectangular data area when the first rectangular data area is sequentially shifted in the second direction while the first rectangular data area is sequentially shifted in the first direction are sequentially output.

* * * * *